United States Patent
Takano

(10) Patent No.: US 11,489,580 B2
(45) Date of Patent: Nov. 1, 2022

(54) COMMUNICATION DEVICE, COMMUNICATION CONTROL DEVICE, COMMUNICATION METHOD, AND COMMUNICATION CONTROL METHOD

(71) Applicant: SONY GROUP CORPORATION, Tokyo (JP)

(72) Inventor: Hiroaki Takano, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/309,872

(22) PCT Filed: Dec. 17, 2019

(86) PCT No.: PCT/JP2019/049268
§ 371 (c)(1),
(2) Date: Jun. 24, 2021

(87) PCT Pub. No.: WO2020/145045
PCT Pub. Date: Jul. 16, 2020

(65) Prior Publication Data
US 2022/0077915 A1   Mar. 10, 2022

(30) Foreign Application Priority Data
Jan. 9, 2019   (JP) .............................. JP2019-002221

(51) Int. Cl.
*H04B 7/08* (2006.01)
*H04W 72/04* (2009.01)
*H04B 7/0413* (2017.01)

(52) U.S. Cl.
CPC ........... *H04B 7/088* (2013.01); *H04B 7/0802* (2013.01); *H04B 7/0877* (2013.01); *H04W 72/042* (2013.01); *H04B 7/0413* (2013.01)

(58) Field of Classification Search
CPC .... H04B 7/088; H04B 7/0802; H04B 7/0877; H04B 7/0413; H04W 72/042
See application file for complete search history.

(56) References Cited

U.S. PATENT DOCUMENTS

2014/0177561 A1   6/2014   Yu et al.
2015/0009968 A1   1/2015   Yu et al.
(Continued)

FOREIGN PATENT DOCUMENTS

CN   104885377 A   9/2015
CN   105379140 A   3/2016
(Continued)

OTHER PUBLICATIONS

International Search Report and Written Opinion of PCT Application No. PCT/JP2019/049268, dated Feb. 25, 2020, 09 pages of ISRWO.

(Continued)

*Primary Examiner* — Janice N Tieu
(74) *Attorney, Agent, or Firm* — Chip Law Group

(57) ABSTRACT

A communication device is provided that includes an obtaining unit that performs signaling to obtain information indicating which beam from among a plurality of reception beams of the communication device is to be used for awaiting arrival of control information, which is included in a control region transmitted in a beam from a base station; and a communication control unit that performs control to await the arrival of beams from the base station in the beam indicated in the information.

15 Claims, 16 Drawing Sheets

(56) References Cited

U.S. PATENT DOCUMENTS

| | | |
|---|---|---|
| 2018/0041995 A1 | 2/2018 | Fukui et al. |
| 2018/0270035 A1* | 9/2018 | Yu .................. H04B 7/0408 |
| 2019/0132851 A1 | 5/2019 | Davydov et al. |
| 2019/0199410 A1* | 6/2019 | Zhao ................. H04W 24/08 |
| 2020/0154409 A1 | 5/2020 | Kang et al. |

FOREIGN PATENT DOCUMENTS

| | | |
|---|---|---|
| CN | 107211422 A | 9/2017 |
| CN | 110113081 A | 8/2019 |
| CN | 110679189 A | 1/2020 |
| EP | 3258729 A1 | 12/2017 |
| EP | 3627931 A1 | 3/2020 |
| JP | 2014-524217 A | 9/2014 |
| JP | 2016-506667 A | 3/2016 |
| JP | 2016-529778 A | 9/2016 |
| KR | 10-2014-0081754 A | 7/2014 |
| KR | 10-2015-0006381 A | 1/2015 |
| KR | 10-2019-0138677 A | 12/2019 |
| WO | 2014/098542 A1 | 6/2014 |
| WO | 2015/005641 A1 | 1/2015 |
| WO | 2016/129417 A1 | 8/2016 |
| WO | 2017/192889 A1 | 11/2017 |
| WO | 2018/212606 A1 | 11/2018 |

OTHER PUBLICATIONS

"Remaining details on beam management", CATT, 3GPP TSG RAN WG1, 91st Meeting, Reno, USA, R1-1720182, Nov. 27-Dec. 1, 2021, 11 pages.

Extended European Search Report of EP Application No. 19908468.2, dated Feb. 18, 2022, 11 pages.

* cited by examiner

FIG.10
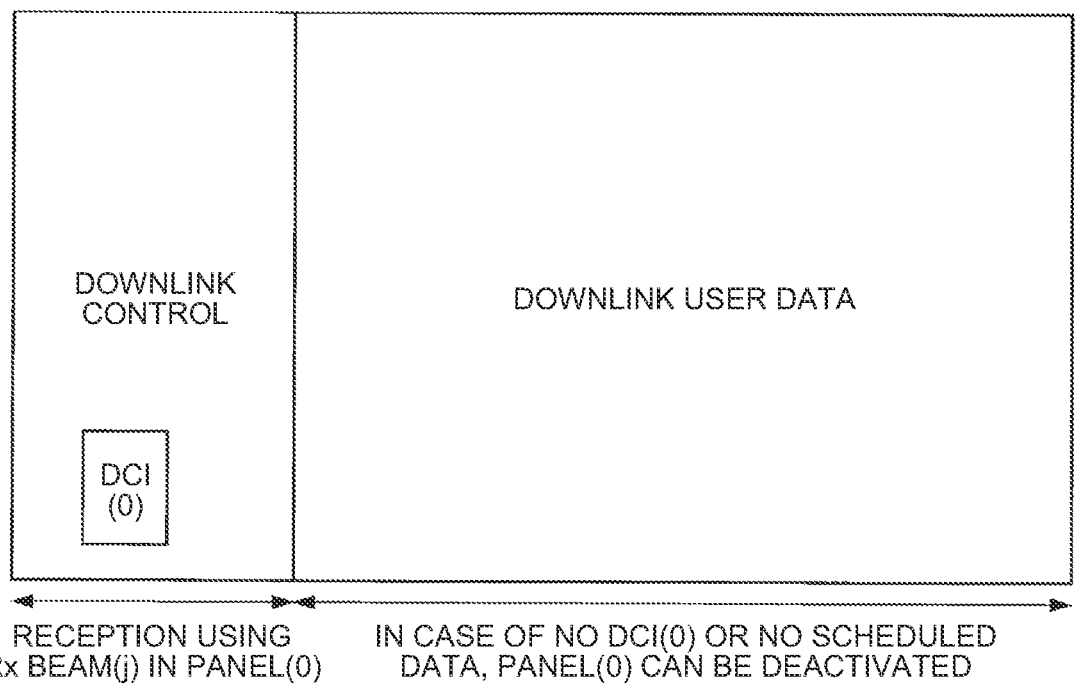
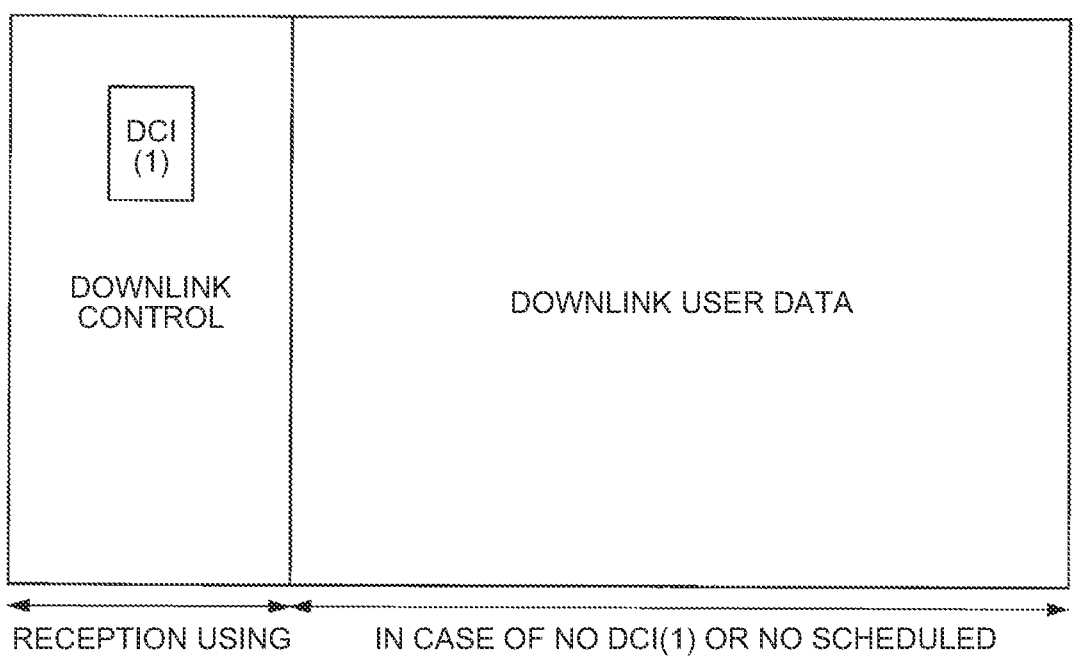

COMMUNICATION DEVICE, COMMUNICATION CONTROL DEVICE, COMMUNICATION METHOD, AND COMMUNICATION CONTROL METHOD

CROSS REFERENCE TO RELATED APPLICATIONS

This application is a U.S. National Phase of International Patent Application No. PCT/JP2019/049268 filed on Dec. 17, 2019, which claims priority benefit of Japanese Patent Application No. JP 2019-002221 filed in the Japan Patent Office on Jan. 9, 2019. Each of the above-referenced applications is hereby incorporated herein by reference in its entirety.

FIELD

The application concerned is related to a communication device, a communication control device, a communication method, and a communication control method.

BACKGROUND

In the 3rd Generation Partnership Project (3GPP), the radio access methods for cellular mobile communication and radio networks (hereinafter, also referred to as "Long Term Evolution (LTE)", "LTE-Advanced (LTE-A)", "LTE-Advanced Pro (LTE-A Pro)", "5G (5th generation)", "New Radio (NR)", "New Radio Access Technology (NRAT)", "Evolved Universal Terrestrial Radio Access (EUTRA)", or "Further EUTRA (FEUTRA)") are being studied. In the following explanation, the term LTE covers LTE-A, LTE-A Pro, and EUTRA; and the term NR covers NRAT and FEUTRA. As far as the LTE and the NR are concerned, a base station device (a base station) is also referred to as eNodeB (evolved NodeB) in the LTE and is also referred as gNodeB in the NR; while a terminal device (a mobile station, a mobile station device, or a terminal) is also called UE (User Equipment). The LTE and the NR are cellular communication systems in which a plurality of areas covered by a base station is arranged in a cellular manner. A single base station can be configured to manage a plurality of cells.

For example, in Patent Literature 1, the disclosure is given about frames that, in a radio communication system using a plurality of beam forming antennas, are meant for communication using beam forming.

CITATION LIST

Patent Literature

Patent Literature 1: JP 2014-524217 A

SUMMARY

Technical Problem

A base station and an antenna can have a plurality of antenna panels, each of which is made of a set of a digital domain and an analog domain. In the case of deciding on the resource for a reference signal that has been subjected to beam forming, the resource setting needs to be done by taking into account the antenna panels.

In that regard, in the application concerned, a communication device, a communication control device, a communication method, and a communication control method in a new and improved form are proposed that enable performing radio communication using the resources that are set by taking into account the antenna panels.

Solution to Problem

According to the present disclosure, a communication device is provided that includes: an obtaining unit that performs signaling to obtain information indicating which beam from among a plurality of reception beams of the communication device is to be used for awaiting arrival of control information, which is included in a control region transmitted in a beam from a base station; and a communication control unit that performs control to await arrival of beams from the base station in the beam indicated in the information.

Moreover, according to the present disclosure, a communication control device is provided that includes: a communication control unit that sets control information indicating which beam from among a plurality of reception beams of a terminal device is to be used for awaiting arrival of control information, which is included in a control region transmitted in a beam from the communication control device; and a communication unit that transmits the information using signaling.

Moreover, according to the present disclosure, a communication method implemented in a processor is provided that includes: obtaining that includes performing signaling to obtain information indicating which beam from among a plurality of reception beams of concerned device is to be used for awaiting arrival of control information, which is included in a control region transmitted in a beam from a base station; and performing control to await arrival of beams from the base station in the beam indicated in the information.

Moreover, according to the present disclosure, a communication control method implemented in a processor is provided that includes: setting control information that indicates which beam from among a plurality of reception beams of a terminal device is to be used for awaiting arrival of control information, which is included in a control region transmitted in a beam from concerned device; and transmitting the information using signaling.

BRIEF DESCRIPTION OF DRAWINGS

FIG. 10 is an explanatory diagram illustrating the format of signals.

DESCRIPTION OF EMBODIMENTS

Figure 1:
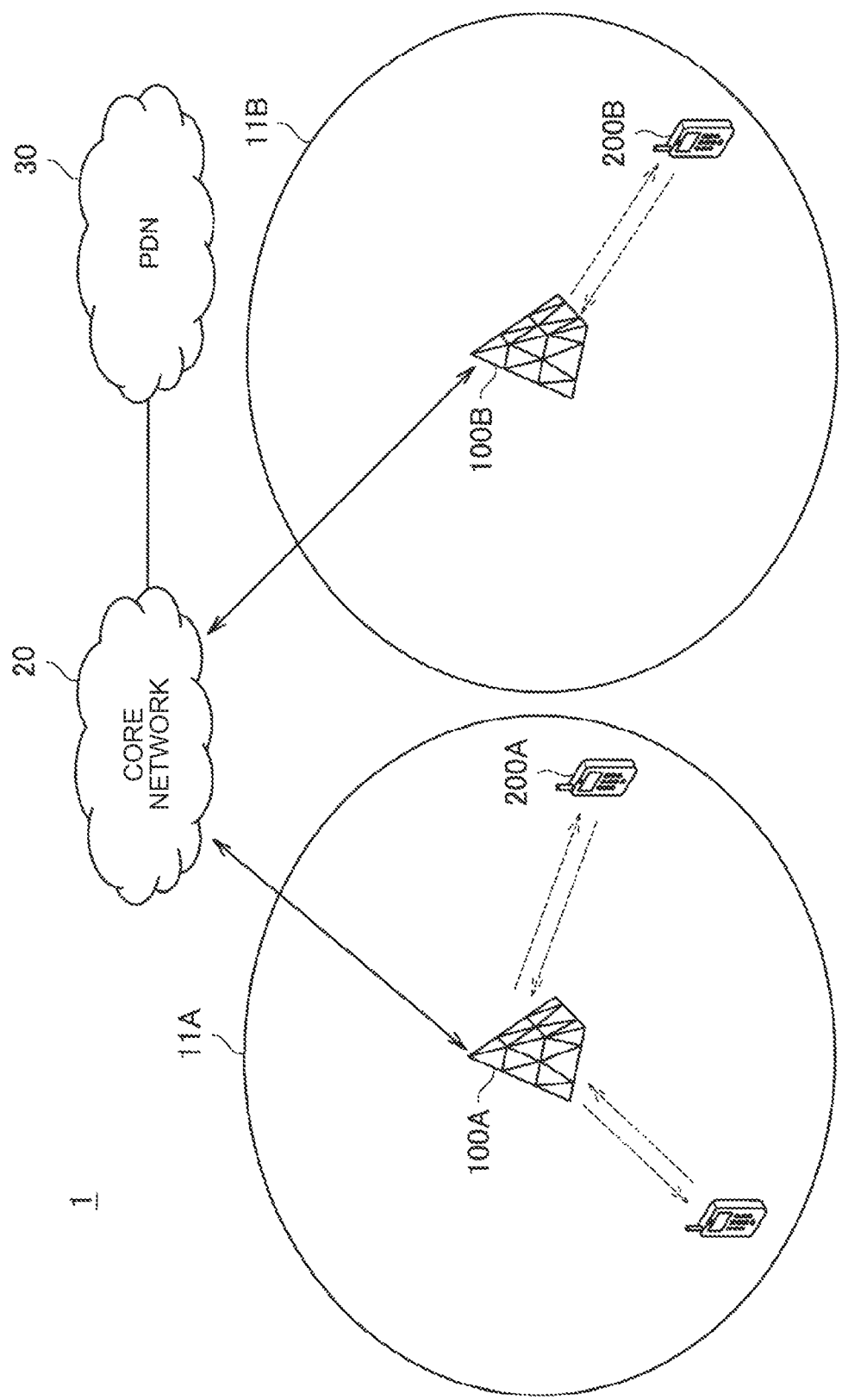
FIG. 1 is a diagram illustrating an exemplary overall configuration of a system according to embodiments of the application concerned.

Preferred embodiments of the application concerned are described below in detail with reference to the accompanying drawings. In the present written description and the drawings, the constituent elements having practically identical functional configuration are referred to by the same reference numerals, and the explanation is not given repeatedly.

The explanation is given in the following sequence.
1. To begin with
1.1. System configuration
1.2. Related technology
2. Exemplary configuration
2.1. Exemplary configuration of base station
2.2. Exemplary configuration of terminal device
3. First embodiment
4. Second embodiment
5. Application examples
5.1. Application examples regarding base station
5.2. Application examples regarding terminal device
6. Summary <<1. To Begin With>>

<1.1. System Configuration>

FIG. 1 is a diagram illustrating an exemplary overall configuration of a system 1 according to embodiments of the application concerned. As illustrated in FIG. 1, the system 1 includes base stations 100 (100A and 100B), terminal devices 200 (200A and 200B), a core network 20, and a PDN (Packet Data Network) 30.

The base stations 100 are communication devices that operate cells 11 (11A and 11B) and provide radio services to one or more terminal devices positioned within the cells 11. For example, the base station 100A provides radio services to the terminal device 200A, and the base station 100B provides radio services to the terminal device 200B. The cells 11 can be operated according to an arbitrary radio communication method such as LTE or NR (New Radio). The base stations 100 are connected to the core network 20. Moreover, the core network 20 is connected to the PDN 30.

The core network 20 can include, for example, an MME (Mobility Management Entity), an S-GW (Serving gateway), a P-GW (PDN gateway), a PCRF (Policy and Charging Rule Function), and an HSS (Home Subscriber Server). The MME is a control node that deals with the signals in the control plane, and manages the movement state of the terminal devices. The S-GW is a control node that deals with the signals in the user plane, and represents a gateway device for switching the transfer path of user data. The P-GW is a control node that deals with the signals in the user plane, and represents a gateway device functioning as the connecting point between the core network 20 and the PDN 30. The PCRF is a control node that controls the policy and the charging of the QoS (Quality of Service) with respect to the bearer. The HSS is a control node that deals with subscriber data and performs service control.

The terminal devices 200 are communication devices that perform radio communication with the base stations 100 under the control of the base stations 100. Each terminal device 200 can be, what is called, a user equipment (UE). For example, the terminal devices 200 transmit uplink signals to the base stations 100, and receive downlink signals from the base stations 100.

<1.2. Related Technology>

(1) BWP

Figure 2:
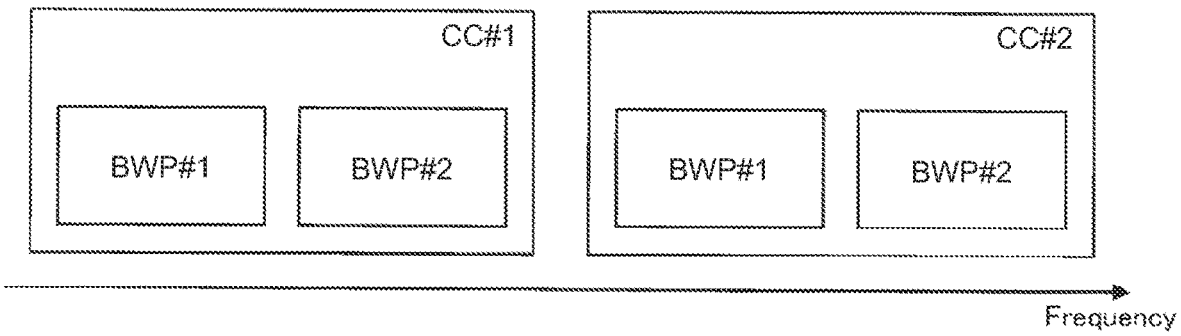
FIG. 2 is a diagram for explaining about BWP.

FIG. 2 is a diagram for explaining about the BWP. As illustrated in FIG. 2, a CC #1 includes a plurality of BWPs (#1 and #2), and a CC #2 includes a plurality of BWPs (#1 and #2). In the present written description, the number written after the hash (#) sign indicates the index. Herein, although BWPs having the same index can be present across different CCs, they all represent different BWPs. The BWPs are formed by dividing a CC, which represents a single operation band width, into a plurality of operation band widths. In each BWP, it is possible to set a different subcarrier spacing.

The BWPs were standardized as the fundamental frame format of the NR of 3GPP Rel15. Regarding the LTE, in the OFDM modulation method standardized in Rel8, the subcarrier spacing is fixed at 15 kHz. On the other hand, in Rel15, the subcarrier spacing can be set to 60 kHz, or 120 kHz, or 240 kHz. As the subcarrier spacing increases, the OFDM symbol becomes shorter in proportion. For example, in the LTE, since the subcarrier spacing is equal to 15 kHz, it becomes possible to transmit one slot in 1 ms. In other words, it is possible to transmit 14 OFDM symbols. On the other hand, in the NR, two slots can be transmitted when the subcarrier spacing is 60 kHz; four slots can be transmitted when the subcarrier spacing is 120 kHz; and eight slots can be transmitted when the subcarrier spacing is 240 kHz. In this way, as a result of increasing the subcarrier spacing, the OFDM symbol length becomes shorter. Correspondingly, it becomes possible to provide a frame configuration that is suitable to low-delay communication.

In the NR, the BWPs having different subcarrier spacing can be provided in a simultaneous manner. Hence, in the NR, a plurality of BWPs can be simultaneously provided according to different use cases.

(2) Number of Active BWPs

The BWPs enabling transmission and reception are also referred to as active BWPs. Moreover, the number of BWPs that enable simultaneous transmission and reception is also called the number of active BWPs. Each base station 100 has a plurality of active BWPs. On the other hand, each terminal device 200 may have only one active BWP. Of course, it is possible to think that, in future, the terminal device 200 would have a plurality of active BWPs. The relevant scenarios are given below in Table 1.

TABLE 1

| Scenarios regarding number of active BWPs | |
|---|---|
| Scenario | Active BWP |
| 3GPP Rel15 | A terminal device is capable of using only one BWP at one time |
| Possible scenario in future | A terminal device is capable of using a plurality of BWPs at the same time |

In the technology according to the application concerned, it is assumed that each terminal device 200 has a single active BWP.

(3) Relationship Between CC and BWP

In the embodiments, the explanation is focused on a plurality of BWPs. However, the method of antenna switching (described later) according to the application concerned is applicable also in the case of having a plurality of CCs (Component Carriers). A CC represents a frequency band in operation. In practice, it is believed that often the neighboring BWPs are applied. That is because the neighboring BWPs have the frequencies close to each other. Hence, in the application concerned, the term "BWP" can be fundamentally substituted with the term "CC". Herein, it is assumed that a plurality of BWPs is usable at the same timing. In the case of the CCs too, it is assumed that a plurality of CCs is used at the same timing.

(4) Codebook Based Beam Forming

When the base station 100 performs beam forming in order to communicate with the terminal device 200, it becomes possible, for example, to enhance the communication quality. Examples of the beam forming technique include the technique for generating beams that follow the terminal device 200; and the technique for selecting beams that, from among the candidate beams, follow the terminal device 200. In the first technique, every time beams are generated, a calculation cost is incurred. For that reason, it is difficult to think that the first technique would be implemented in the future radio communication systems (for example, 5G). On the other hand, the second technique has been implemented in the FD-MIMO (Full Dimension Multiple Input Multiple Output) in the release 13 of 3GPP (Third Generate Partnership Project). The second technique is also referred to as codebook based beam forming.

In the codebook based forming, the base station 100 prepares (i.e., generates) beams that are oriented in all directions; selects beams suitable for the target terminal device 200 from among the prepared beams; and communicates with the terminal device 200 with the selected beams. For example, when it is possible to perform communication in 360° in the horizontal direction, for example, the base station 100 prepares for 360 types of beams, one beam per degree. If it is to ensure that there is half-overlapping of beams, the base station prepares 720 types of beams. Regarding the vertical direction, for example, the base station 100 prepares beams over 180° spanning from −90° to +90°.

Meanwhile, since the terminal device 200 only observes the beams, there is not much need for it to know about the existence of the codebook in the base station 100.

Hereinafter, a plurality of beams prepared in advance by the base station 100 is also called a beam group. For example, a beam group can be defined for each frequency band. Alternatively, a beam group can be defined for each Rx/Tx beam or for each downlink/uplink.

(5) Beam Sweeping

In the NR, in order to ensure that the most suitable beam is selected for communication, the study is going on about beam sweeping in which a measurement signal (a known signal) is transmitted or received using each of a plurality of beams belonging to a beam group. The measurement signal is sometimes also referred to as a reference signal. Based on the measurement results of the measurement signal transmitted while performing beam sweeping, the most suitable transmission beam (hereinafter, also referred to as the Tx beam) can be selected. An example of that is explained below with reference to FIG. 3.

Figure 3:
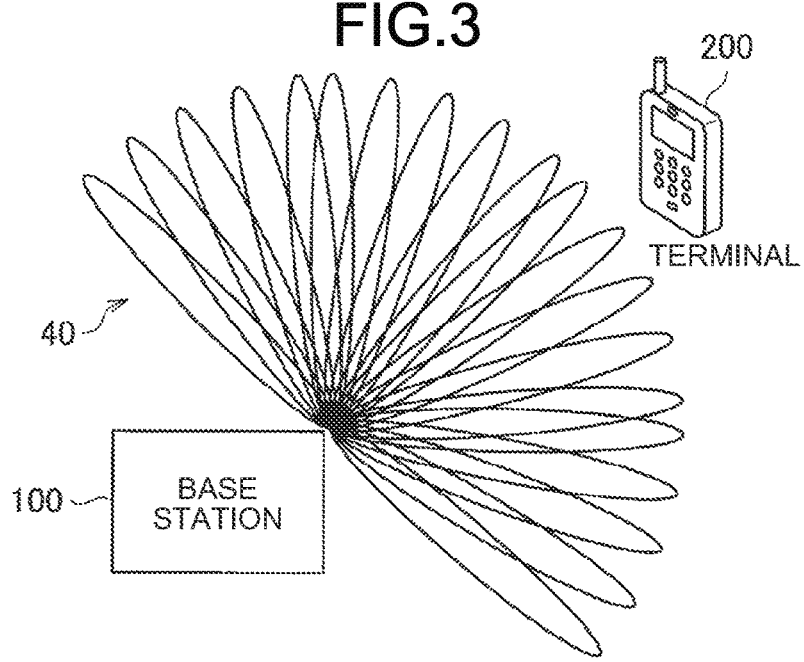
FIG. 3 is a diagram for explaining about beam sweeping.

FIG. 3 is a diagram for explaining about the beam sweeping. In the example illustrated in FIG. 3, the base station transmits the measurement signal while performing beam sweeping (i.e., while varying the Tx beam) using a beam group 40. Hereinafter, the transmission performed while performing beam sweeping is also referred to as beam sweeping transmission. Then, the terminal device 200 measures the measurement signals that are received due to beam sweeping transmission, and decides on the Tx beam that is the easiest to receive. In this way, the most suitable Tx beam of the base station 100 gets selected. Meanwhile, if the same procedure is followed by interchanging the base station 100 and the terminal device 200, then the base station 100 becomes able to select the most suitable Tx beam for the terminal device 200.

On the other hand, based on the measurement results obtained by receiving the measurement signal while performing beam sweeping, the most suitable reception beam (hereinafter, also referred to as the Rx beam) can also be selected. For example, the terminal device 200 transmits a measurement signal in the uplink. Then, the base station 100 receives the measurement signal while performing beam sweeping (i.e., by varying the Rx beam), and decides on the Rx beam that is the easiest to receive. In this way, the most suitable Rx beam for the base station 100 gets decided. Meanwhile, if the same procedure is followed by interchanging the base station 100 and the terminal device 200, then the terminal device 200 becomes able to select the most suitable Rx beam for itself. Hereinafter, the reception performed while performing beam sweeping is also referred to as beam sweeping reception.

The device in which the measurement signal subjected to beam sweeping transmission is received and measured reports the measurement result to the device that had transmitted the measurement signal. The measurement result includes information indicating the most suitable Tx beam. The most suitable Tx beam implies, for example, the Tx beam having the highest amount of received power. The measurement result either can include information indicating a single Tx beam having the highest amount of received power, or can include information indicating the top K number of Tx beams having a high amount of received power. For example, the measurement result includes identification information of the Tx beam (for example, the index of the beam) in a corresponding manner to the information indicating the amount of received power of the Tx beam (for example, the RSRP (Reference Signal Received Power)).

The beams involved in beam sweeping are transmitted by applying directionality to the reference signal that is a known signal. That enables the terminal device 200 to distinguish among the beams using the reference signal serving as the resource.

The base station 100 can provide a single beam using a single reference signal as the resource. That is, if 10 resources are provided, the base station 100 becomes able to perform beam sweeping corresponding to 10 different directions. The 10 resources can be collectively called a resource set. Thus, a single resource set having 10 resources enables providing beam sweeping corresponding to 10 directions.

(6) CSI acquisition Procedure

After the most suitable beam has been selected in the beam selection procedure accompanying beam sweeping, a CSI (Channel State Information) acquisition procedure is performed. The CSI acquisition procedure enables obtaining the channel quality of the communication performed using the selected beam. For example, in the CSI acquisition procedure, a CQI (Channel Quality Indicator) is obtained.

The channel quality is used in determining the communication parameters for the modulation method. If a modulation method such as the QPSK (Quadrature Phase Shift Keying) is implemented in which only a small number of bits can be transmitted even when the channel quality is excellent, then it results in a low throughput. On the other hand, if a modulation method such as 256 QAM (Quadrature Amplitude Modulation) is implemented in which a large number of bits can be transmitted even when the channel quality is poor, then it results in a low throughput on account of a failure in data reception at the receiving side. In this way, obtaining the channel quality with accuracy is significant for achieving enhancement in the throughput.

Figure 4:
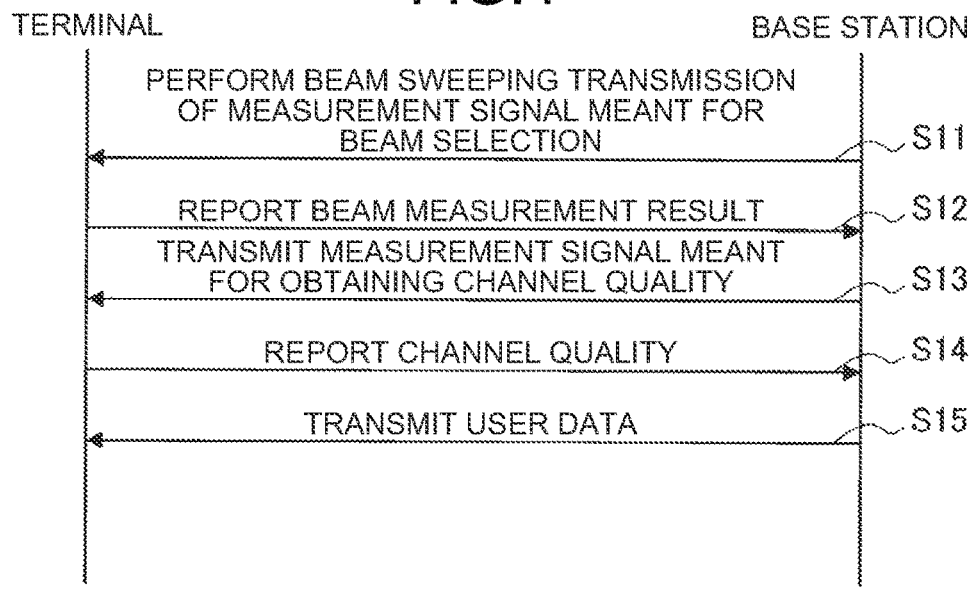
FIG. 4 is a sequence diagram illustrating an exemplary flow of a typical beam selection procedure and a typical CSI acquisition procedure performed between a base station and a terminal device.
Figure 5:
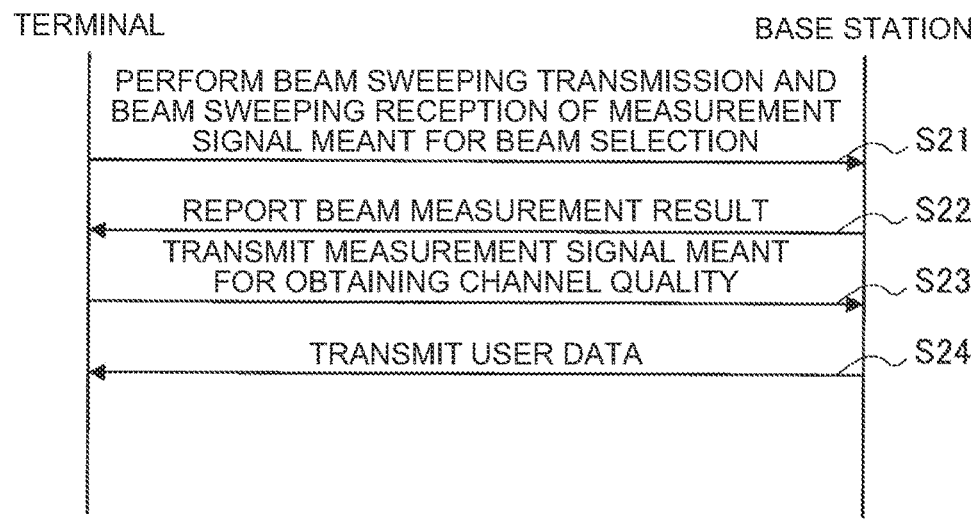
FIG. 5 is a sequence diagram illustrating another exemplary flow of the typical beam selection procedure and the typical CSI acquisition procedure performed between a base station and a terminal device.

FIG. 4 is a sequence diagram illustrating an exemplary flow of the typical beam selection procedure and the typical CSI acquisition procedure performed between a base station and a terminal device. As illustrated in FIG. 4, the base station performs beam sweeping transmission of the measurement signal meant for beam selection (Step S11). Then, the terminal device measures the measurement signal meant for beam selection, and reports the beam measurement result to the base station (Step S12). The beam measurement result includes information indicating, for example, the result of selection of the most suitable Tx beam in the base station. Subsequently, using the selected most suitable Tx beam, the base station transmits a measurement signal meant for obtaining the channel quality (Step S13). Then, the terminal device reports, to the base station, the channel quality obtained based on the measurement result regarding the measurement signal (Step S14). Subsequently, the base station transmits, to the terminal device, user data using the communication parameters that are based on the reported channel quality (Step S15).

(7) Analog-Digital Hybrid Antenna Architecture

In order to control the directionality of an antenna, it is possible to think of an architecture in which all processing is performed using an analog circuit. Such an architecture is also referred to as a full-digital architecture. In a full-digital architecture, in order to control the directionality of an antenna, antenna weights equal in number to the number of antennas (i.e., the antenna elements) are applied in the digital domain (i.e., using the digital circuit). Herein, the antenna weights represent the weights for controlling the amplitude and the phase. However, a disadvantage of a full-digital architecture is that the digital circuit becomes large in size. In that regard, as an architecture that resolves the disadvantage of a full-digital architecture, an analog-digital hybrid antenna architecture is available.

Figure 6:
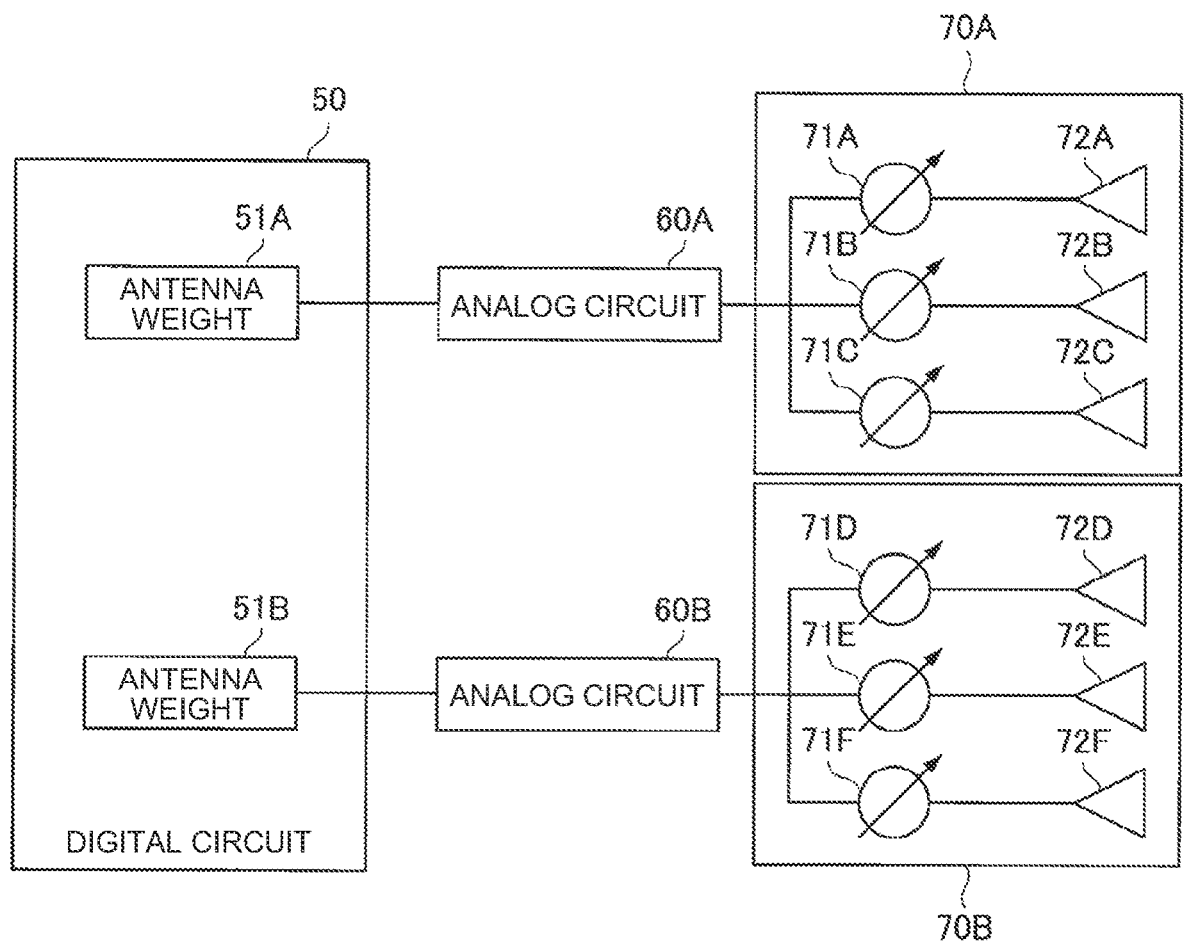
FIG. 6 is a diagram for explaining an example of an analog-digital hybrid antenna architecture.

FIG. 6 is a diagram for explaining an example of the analog-digital hybrid antenna architecture. The architecture illustrated in FIG. 6 includes a digital circuit 50, analog circuits 60 (60A and 60B), and antenna panels 70 (70A and 70B). The digital circuit can have a plurality of antenna weights 51 (51A and 51B) applied therein. The analog circuits 60 and the antenna panels 70 are installed to be equal in number to the number of antenna weights 51 applicable in the digital circuit 50. In the antenna panels 70, a plurality of antennas 72 (72A to 72F) is installed; and phase shifters 71 (71A to 71F) are installed to be equal in number to the number of antennas 72. The phase shifters 71 are devices that apply antenna weights enabling only phase control in the analog domain.

The characteristics of the antenna weights in the digital domain and the characteristics of the antenna weights in the analog domain are given below in Table 2.

TABLE 2

Characteristics of antenna weights in digital domain and characteristics of antenna weights in analog domain

| | Analog domain | Digital domain |
|---|---|---|
| Controllable content | Phase | Amplitude and phase |
| Whether analog or digital | Analog | Digital |
| Whether the applied position is in the time region or in the frequency region | Time region | In the OFDM modulation method, the applied position is in the pre-FFT frequency region on the transmitting side, and is in the post-IFFT frequency region on the receiving side |
| Whether different beams can be provided using frequency resources in the sametime resource | Not possible | Possible |

When the OFDM (Orthogonal Frequency Division Multiplexing) modulation method is implemented, the antenna weights of the digital domain are applied in the frequency region. For example, the antenna weights of the digital domain are applied prior to the IFFT (inverse fast Fourier transform) during the transmission, and are applied after the FFT (fast Fourier transform) during the reception.

Thus, the antenna weights of the digital domain are applied in the frequency region. As a result of applying the antenna weights of the digital domain; even if the time resource is the same, beams can be transmitted in different directions using different frequency resources. On the other hand, the antenna weights of the analog domain are applied in the time region. Hence, even when the antenna weights of the analog domain are applied; in the same time resource, beams can be oriented only in the same direction across all frequency resources.

That is, for each antenna panel 70, even if the time resource is the same, beams can be transmitted in different directions using different frequency resources. On the other hand, in a single antenna panel 70, using the same time resource and the same frequency resource, the beams can be oriented in only one direction. Thus, in the analog-digital hybrid antenna architecture, the directions in which the beams can be transmitted and received in the same time resource correspond to the number of antenna panels 70. Moreover, in the analog-digital hybrid antenna architecture, the number of beam groups that can be subjected to beam sweeping transmission or beam sweeping reception in the same time resource corresponds to the number of antenna panels 70.

Such an analog-digital hybrid antenna architecture can be adapted in the base station 100 as well as in the terminal device 200.

(8) Antenna Panel

In FIG. 6, to a single weight in the digital domain, three phase shifters in the analog domain are connected. The set of a single weight in the digital domain and three phase shifters in the analog domain can be placed as an antenna panel as a whole. In the example illustrated in FIG. 6, three antenna elements constitute a single antenna panel, and there are two such antenna panels. As explained with reference to Table 2, usually, in a single panel, it is not possible to create beams in different directions using different frequencies at the same time. However, if two panels are used, beams in different directions can be created even at the same time. Such a configuration of antenna panels is used in base stations as well as terminal devices.

Figure 7:
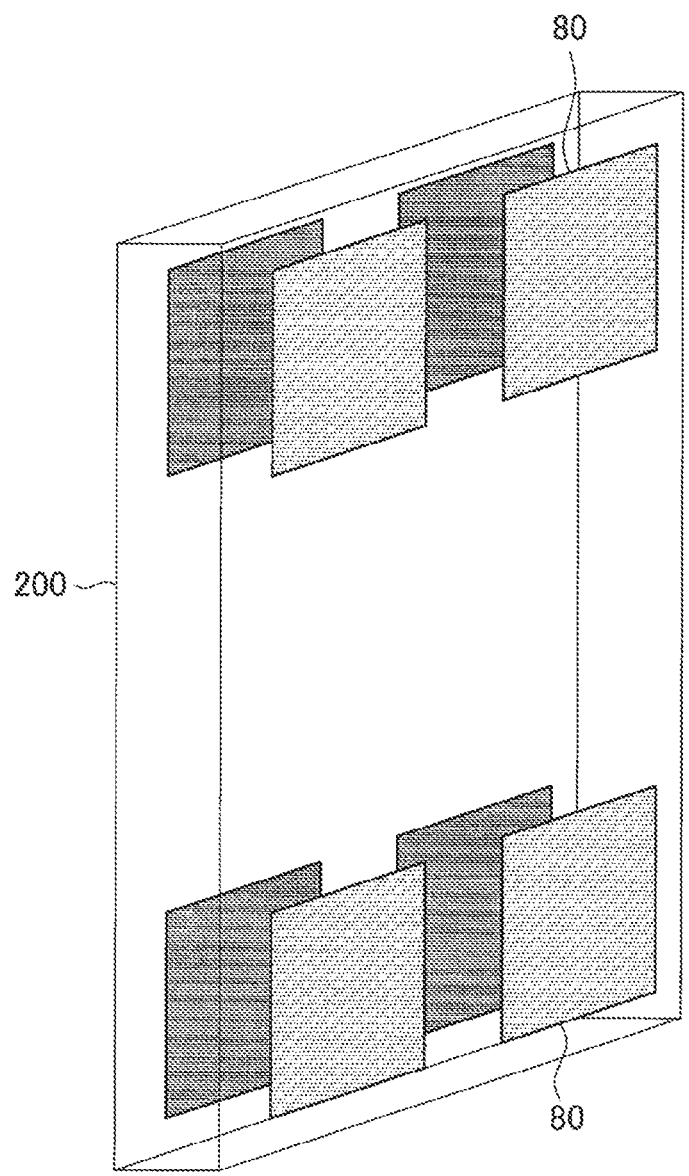
FIG. 7 is an explanatory diagram illustrating an example of placement of antenna panels in a terminal device.

FIG. 7 is an explanatory diagram illustrating an example in which eight antenna panels are placed in the terminal device 200. In FIG. 7 is illustrated an example in which four antenna panels are placed on the front side and four antenna panels are placed on the rear side, which results in a total of eight antenna panels. There is no restriction on the number of antenna elements mounted on a single antenna panel. For example, four antenna elements are mounted on a single antenna panel.

(9) Reference Signal and Resource of User Data

In order to perform beam sweeping or the CSI acquisition procedure, transmission and reception of a reference signal is required between the base station 100 and the terminal device 200. Moreover, also in the case of transmitting and receiving user data between the base station 100 and the terminal device 200, it is required to transmit and receive a reference signal. Fundamentally, such reference signals are specified in terms of the frequency resource and the time resource, and some of the reference signals are included also in the case of specifying the resource using orthogonal sequences. On the other hand, regarding the user data, a scheduler included in the control signal specifies the frequency resource and the time resource of the user data. In the case of the user data, orthogonal sequences are not assigned as the resource. Thus, only the frequency resource and the time resource are assigned.

TABLE 3

Regarding resource of each signal

| | Reference signal | Downlink Control signal | User data |
|---|---|---|---|
| Resource type | Frequency, time, sequence | Frequency, time | Frequency, time |
| Allocation method | RRC signaling (semi-static), DCI (Dynamic) | Static (head of a slot) | Downlink control signal |

(10) Selection of Antenna Panel and Beam on Receiving Side (10-1) Selection of Antenna Panel and Beam at Beam Management Stage During the beam management, regarding the beams coming from the base station 100, the terminal device 200 goes through a trial and error process and decides which antenna panels are to be used to receive which beams. Herein, fundamentally, different antenna panels can operate at the same time. Hence, for example, when four resources are set as the resources of the reference signal with respect to the same downlink beam, the terminal device 200 can use four different reception beams in each antenna panel, and decide on the preferred reception beam. This operation is performed for the number of times equal to the number of downlink beams corresponding to different directions in the base station 100. When there are 10 downlink beams, the terminal device 200 can observe the reception beams using 10×4=40 resources, and can decide on the preferred beam coming from the base station 100 and decide on the antenna panel and the preferred beam in the terminal device 200.

(10-2) Selection of Antenna Panel and Beam at CSI Procedure Stage

In the CSI procedure stage, transmission precoding (finer antenna control) is used in the base station 100, and the channel quality is confirmed in a more detailed manner. In the CSI procedure stage, the reference signal for CSI procedure is received in that antenna panel of the terminal device 200 which has been identified in the earlier beam management stage, and in the beam which is determined to be the most preferred beam in that antenna panel.

(10-3) Selection of Antenna Panel and Beam at User-Data Reception Stage

In the user-data reception stage, the terminal device 200 can receive the user data using the antenna panel and the reception beam decided at the time of beam management in an identical manner to the CSI procedure stage. However, if there are two beams that use antenna panels, then the terminal device 200 does not know how to select the antenna panel and the beam.

Figure 8:
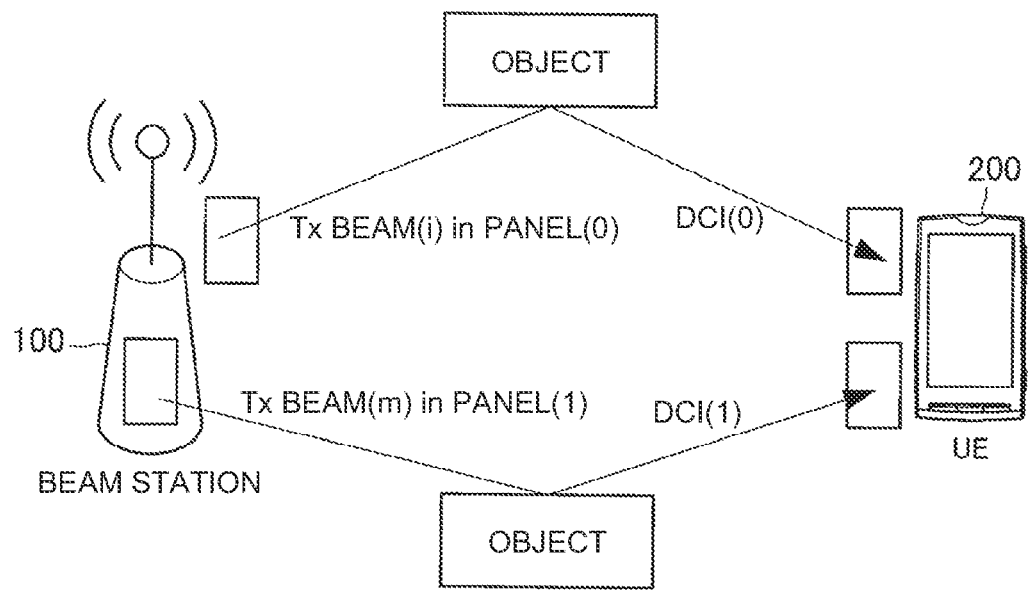
FIG. 8 is an explanatory diagram illustrating an example of beam sets.

Assume that the terminal device 200 twice performs the operations for beam management, and decides on antenna panels and beams that are suitable to the beams transmitted from two different antenna panels of the base station 100. In that case, two beam sets are involved as illustrated in FIG. 8. A beam set implies the link of a beam configured by the combination of an antenna panel and a beam on the transmission side and an antenna panel and a beam on the receiving side.

Beam set (0): (TX beam (i) in BS antenna panel (0))+(RX beam (j) in UE antenna panel (0))

Beam set (1): (TX beam(m) in BS antenna panel (1))+(RX beam (n) in UE antenna panel (1))

Since a DCI, which represents the control signal for specifying the resource of the user data, itself is transmitted using a beam, it is a major issue to ensure that the terminal device 200 is aware of the beam set in which the DCI would be received. It is possible to think of a method in which the beam set (0) and the beam set (1) mentioned above are kept running at all times in the terminal device 200.

Figure 9:
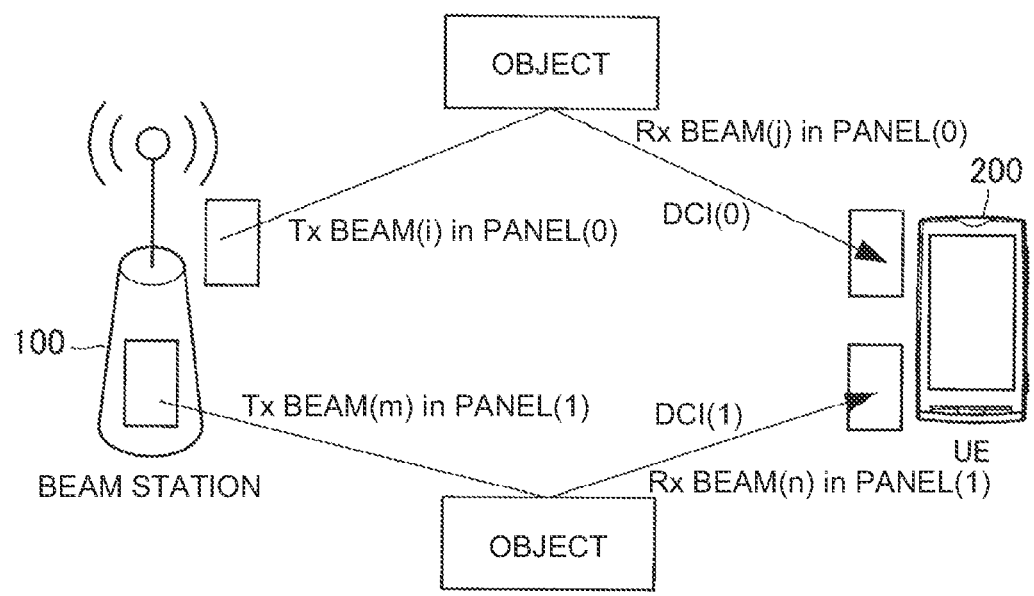
FIG. 9 is an explanatory diagram illustrating an example of beam sets.

Moreover, when there are two beam sets as mentioned above, the DCIs representing the control signals include a DCI (0) for the beam set (0) and a DCI (1) for the beam set (1). The terminal device 200 can correctly receive the DCI (0) using the beam (j) of the antenna panel (0). Moreover, the terminal device 200 can correctly receive the DCI (1) using the beam (n) of the antenna panel (1). FIG. 9 is an explanatory diagram illustrating the situation in which the terminal device 200 receives the DCIs.

FIG. 10 is an explanatory diagram illustrating the format of signals. As illustrated in FIG. 10, in a downlink control region, the antenna panel (0) as well as the antenna panel (1) in the terminal device 200 are kept running, and the DCI (0) or the DCI (1) is received. Subsequently, if the DCI (0) is in the downlink control region and the scheduled data is in a downlink user data region, then the terminal device 200 continues with the reception using the beam (j) of the antenna panel (0). The same is the case regarding the DCI (1). On the other hand, if the DCI (0) is not present in the downlink control region, then the terminal device 200 promptly deactivates the antenna panel (0). The same is the case regarding the DCI (1). Thus, if the DCI (1) is not present in the downlink control region, then the terminal device 200 promptly deactivates the antenna panel (1).

However, in this method, the arrival of all beam sets is awaited even in the period of time in which there is no need to do so. That is not desirable from the perspective of power consumption of the terminal device 200.

Conventionally, after receiving a DCI using the default reception beam, the terminal device 200 uses the control information in that DCI to convey about the reception beam that should be used in the subsequent user data (refer to 3GPP TS38.331 Section 6.3.2 TCI-State). When there is no information regarding any beam, the terminal device 200 has no other operation but to await the arrival of a DCI using the same beam as the reception beam in which the synchronization signal was received.

In the embodiments of the application concerned as described below, a method is disclosed that enables a terminal device to correctly receive the control signals from a plurality of base stations and a plurality of antenna panels.

<<2. Exemplary Configuration>>

<2.1. Exemplary Configuration of Base Station>

Figure 11:
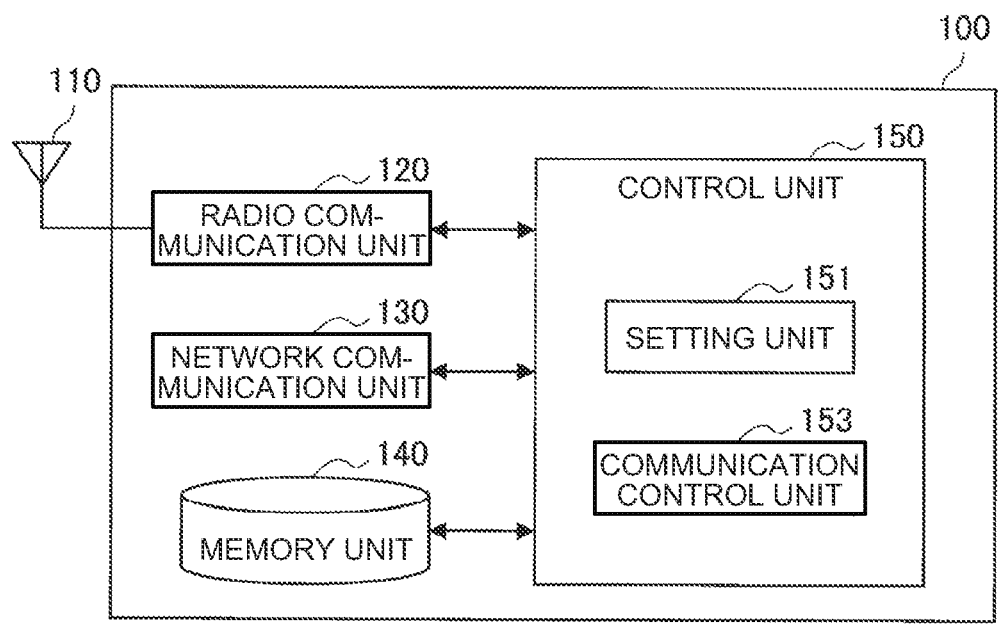
FIG. 11 is a block diagram illustrating an exemplary configuration of the base station according to the embodiments.

FIG. 11 is a block diagram illustrating an exemplary configuration of the base station 100 according to the embodiments. With reference to FIG. 11, the base station 100 includes an antenna unit 110, a radio communication unit 120, a network communication unit 130, a memory unit 140, and a control unit 150.

(1) Antenna Unit 110

The antenna unit 110 radiates the signals, which are output by the radio communication unit 120, as radio waves into the space. Moreover, the antenna unit 110 converts the radio waves in the space into signals, and outputs those signals to the radio communication unit 120.

Particularly, in the embodiments, the antenna unit 110 includes a plurality of antenna elements and is capable of forming beams.

(2) Radio Communication Unit 120

The radio communication unit 120 transmits and receives signals. For example, the radio communication unit 120 transmits downlink signals to terminal devices and receives uplink signals from terminal devices.

Particularly, in the embodiments, the radio communication unit 120 is capable of forming a plurality of beams with the use of the antenna unit 110 and communicating with terminal devices.

(3) Network Communication Unit 130

The network communication unit 130 transmits and receives information. For example, the network communication unit 130 transmits information to other nodes and receives information from other nodes. For example, the other nodes include other base stations and core network nodes.

(4) Memory Unit 140

The memory unit 140 is used to store, either temporarily or permanently, programs meant for the operation of the base station 100 and a variety of data.

(5) Control Unit 150

The control unit 150 controls the overall operations of the base station 100, and provides various functions of the base station 100. In the embodiments, the control unit 150 is configured with a setting unit 151 and a communication control unit 153.

The setting unit 151 performs various settings regarding radio communication between the base station 100 and the terminal device 200. Particularly, in the embodiments, as explained later, the setting unit 151 performs various settings to ensure that the control signals from the base station 100 are efficiently received in the terminal device 200. Based on the settings performed by the setting unit 151, the communication control unit 153 performs a communication control operation for transmitting signals from the radio communication unit 120.

The control unit 150 can further include other constituent elements other than the constituent elements explained above. That is, the control unit 150 can perform operations other than the operations performed by the constituent elements explained above.

<2.2. Exemplary Configuration of Terminal Device>

Figure 12:
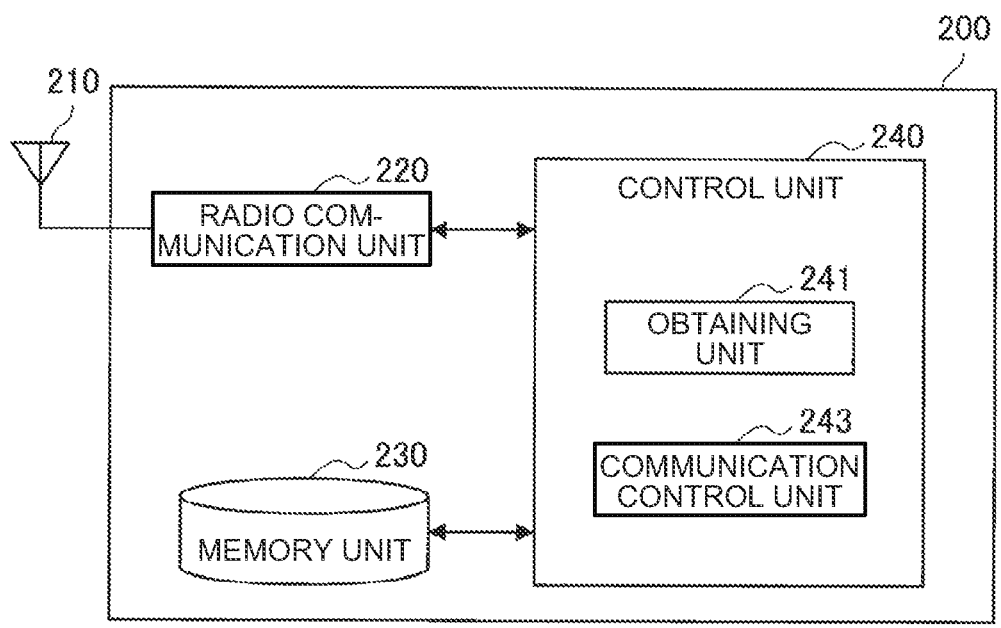
FIG. 12 is a block diagram illustrating an exemplary configuration of the terminal device according to the embodiments.

FIG. 12 is a block diagram illustrating an exemplary configuration of the terminal device 200 according to the embodiments. With reference to FIG. 12, the terminal device 200 includes an antenna unit 210, a radio communication unit 220, a memory unit 230, and a control unit 240.

(1) Antenna Unit 210

The antenna unit 210 radiates the signals, which are output by the radio communication unit 220, as radio waves into the space. Moreover, the antenna unit 210 converts the radio waves in the space into signals, and outputs those signals to the radio communication unit 220.

Particularly, in the embodiments, the antenna unit 210 includes a plurality of antenna elements and is capable of forming beams.

(2) Radio Communication Unit 220

The radio communication unit 220 transmits and receives signals. For example, the radio communication unit 220 receives downlink signals from base stations and transmits uplink signals to base stations.

Particularly, in the embodiments, the radio communication unit 220 is capable of forming a plurality of beams with the use of the antenna unit 210 and communicating with base stations.

(3) Memory Unit 230

The memory unit 230 is used to store, either temporarily or permanently, programs meant for the operation of the terminal device 200 and a variety of data.

(4) Control Unit 240

The control unit 240 controls the overall operations of the terminal device 200, and provides various functions of terminal device 200. In the embodiments, the control unit 240 is configured with an obtaining unit 241 and a communication control unit 243.

The obtaining unit 241 obtains the information transmitted from the base station 100 during the radio communication performed between the base station 100 and the terminal device 200. Particularly, in the embodiments, as explained later, the obtaining unit 241 obtains a variety of information for ensuring that the control signals from the base station 100 are efficiently received in the terminal device 200. The communication control unit 243 performs a communication control operation to ensure that signals are transmitted from the radio communication unit 220 based on the information obtained by the obtaining unit 241.

The control unit 240 can further include other constituent elements other than the constituent elements explained above. That is, the control unit 240 can perform operations other than the operations performed by the constituent elements explained above.

<<3.1. First Embodiment>>

For example, there are times when, although the terminal device 200 has two antenna panels, only one antenna panel can be operated at one time. That is believed to happen because of the restrictions on the cost or the power consumption of the terminal device 200. Such a terminal device 200 is not able to await the arrival of the DCIs in the downlink control region by operating two antenna panels at the same time.

In that regard, in a first embodiment, in a plurality of downlink control regions, which beam of which antenna panel is to be used for the waiting task is set in advance in the terminal device 200 by the base station 100 by performing signaling. The terminal device 200 performs operations based on the setting received from the base station 100. At that time, regarding the beams that use different antenna panels, the specification can be done by the base station 100 in the form of specifying the resources of the reference signal. The base station 100 uses signaling to instruct about the available DCIs from among a plurality of DCIs in the downlink control regions. The terminal device 200 receives the DCIs based on the instruction from the base station 100 and performs operations.

In the first embodiment, the base station 100 transmits downlink control regions with gaps provided therebetween for enabling the terminal device 200 to switch among different antenna panels meant for receiving beams. Then, the terminal device 200 receives the downlink control regions with gaps provided therebetween.

Figure 13:
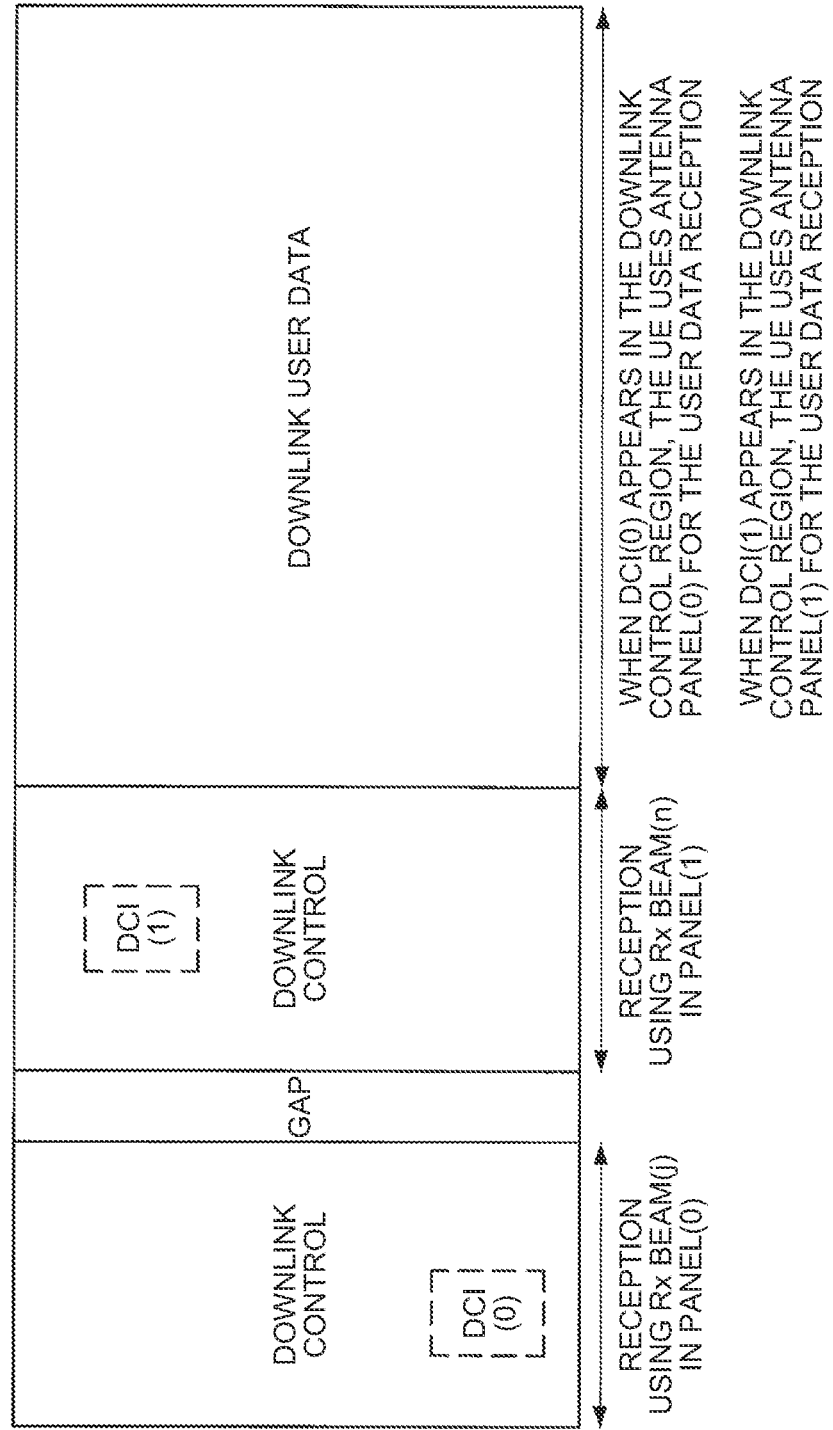
FIG. 13 is an explanatory diagram illustrating an example of a downlink control region according to the first embodiment.

A specific example is explained below. FIG. 13 is an explanatory diagram illustrating an example of the downlink control region according to the first embodiment. As illustrated in FIG. 13, according to the first embodiment, the downlink control region is separated, in the time region, into regions corresponding to two antenna panels. A region meant for the DCI (0) is received in the antenna panel (0), and a region meant for the DCI (1) is received in the antenna panel (1). In between the region meant for the DCI (0) and the region meant for the DCI (1), a gap is provided that enables switching of antenna panels and that corresponds to the buffer time until the behavior of the circuits at the receiving side steadies down. When the DCI (0) is received in the region meant for it, the terminal device 200 need not wait in the region meant for the DCI (1) and receives the downlink user data in the same antenna panel (0).

Meanwhile, in a downlink control region, a plurality of DCIs corresponding to a plurality of terminal devices 200 is present. Thus, the concerned terminal device 200 searches the downlink control region for the DCI addressed thereto, and receives that DCI.

If the DCI (0) is not present in the region meant for it or if the scheduled data is not present in spite of the existence of the DCI (0), the antenna panel (0) is deactivated and the antenna panel (1) is activated during the provided gap. Then, if the DCI (1) is present in the region meant for it and if the scheduled data is present, then the downlink user data is received in the antenna panel (1).

Between the two downlink control regions, the beam set which region is to be used for the waiting task, that is, whether the antenna panel (0) or the antenna panel (1) is to be used for the waiting task can be notified in advance from the base station 100 to the terminal device 200 based on RRC signaling.

Assume that only two downlink control regions are set by the base station 100 but four beam sets have been obtained in advance. In that case, the terminal device 200 is not able to perform signaling regarding which antenna panel is to be used in which downlink control region.

In that regard, the following settings are performed in advance in the terminal device 200 by the base station 100.

downlink control region (0): antenna panels (0) and (1)
downlink control region (1): antenna panels (2) and (3)

Figure 14:
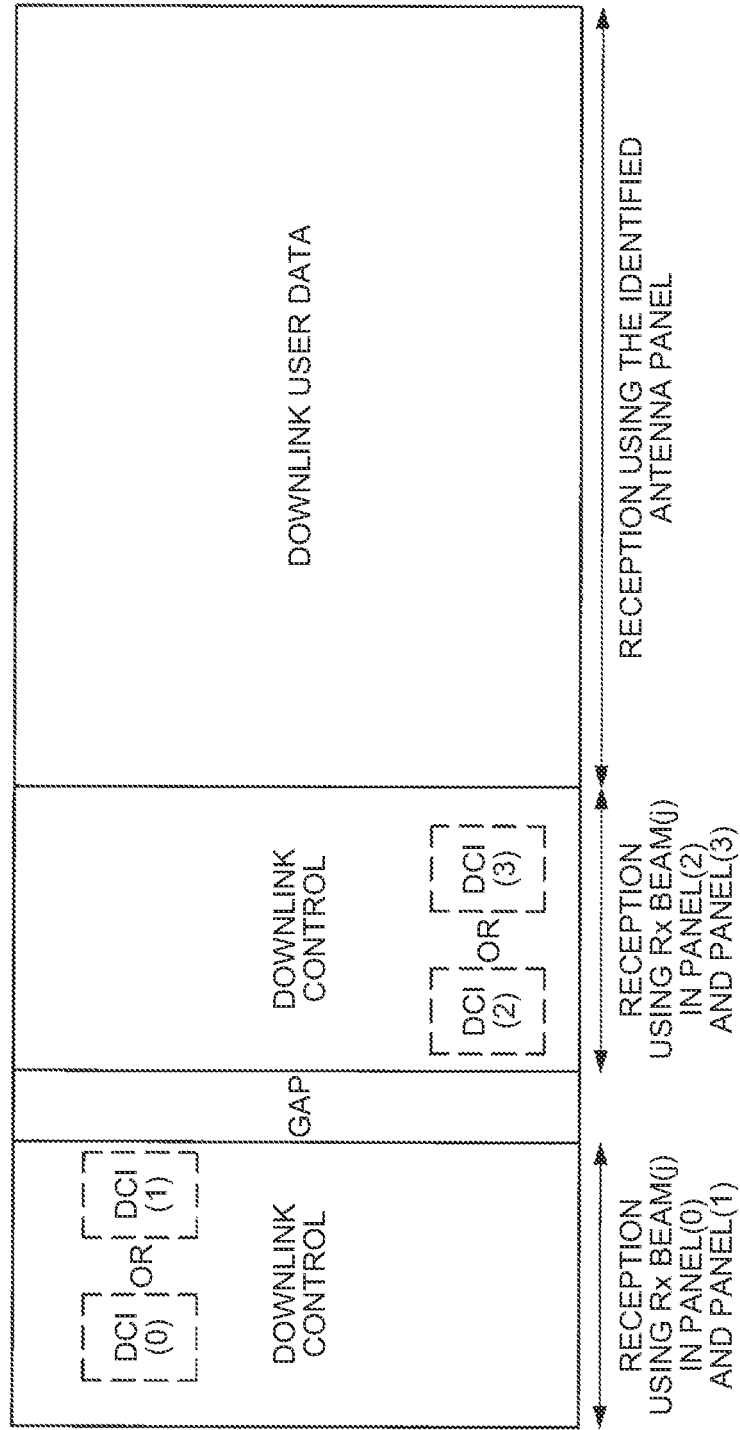
FIG. 14 is an explanatory diagram illustrating an example of regions set by the base station.

In this way, as a result of the setting performed in advance in the terminal device 200 by the base station 100; for example, when it is possible to simultaneously activate up to two antennas in each region, the terminal device 200 simultaneously operates the antenna panels in each region. FIG. 14 is an explanatory diagram illustrating the regions set by the base station 100. In FIG. 14 is illustrated an example in which, as explained earlier, the antenna panels (0) and (1) are set for use in the downlink control region (0), and the antenna panels (2) and (3) are set for use in the downlink control region (1).

As a result, the terminal device 200 in which the number of simultaneously-operable antenna panels is restricted becomes able to use a plurality of antenna panels, thereby enabling achieving enhancement in the throughput of the uplink and the throughput of the downlink.

<<4. Second Embodiment>>

In the first embodiment, the throughput of the uplink and the throughput of the downlink of the terminal device 200 can be enhanced as a result of using a plurality of antenna panels. However, even if the terminal device 200 can simultaneously activate a plurality of antenna panels; simultaneously using the antenna panels corresponding to a plurality of beam sets and simultaneously performing the waiting task in the downlink control regions exerts a burden on the terminal device 200.

In that regard, in a second embodiment, the base station 100 notifies the terminal device 200 about the main beam set from among a plurality of beam sets; and, according to the notification from the base station 100, the terminal device 200 decides on the beams to be used in the antenna panels meant for reception. The terminal device 200 refers to the control signals present in the beams constituting the main beam set, and decides on the antenna panels and the beams to be used at the time of receiving control signals and data of the sub beams included in the sub beam sets that are different than the main beam set.

Moreover, the base station 100 performs signaling in such a way that, in a DCI, it becomes possible to specify the period of time for continuing with the activation of beams that use specific antenna panels.

Figure 15:
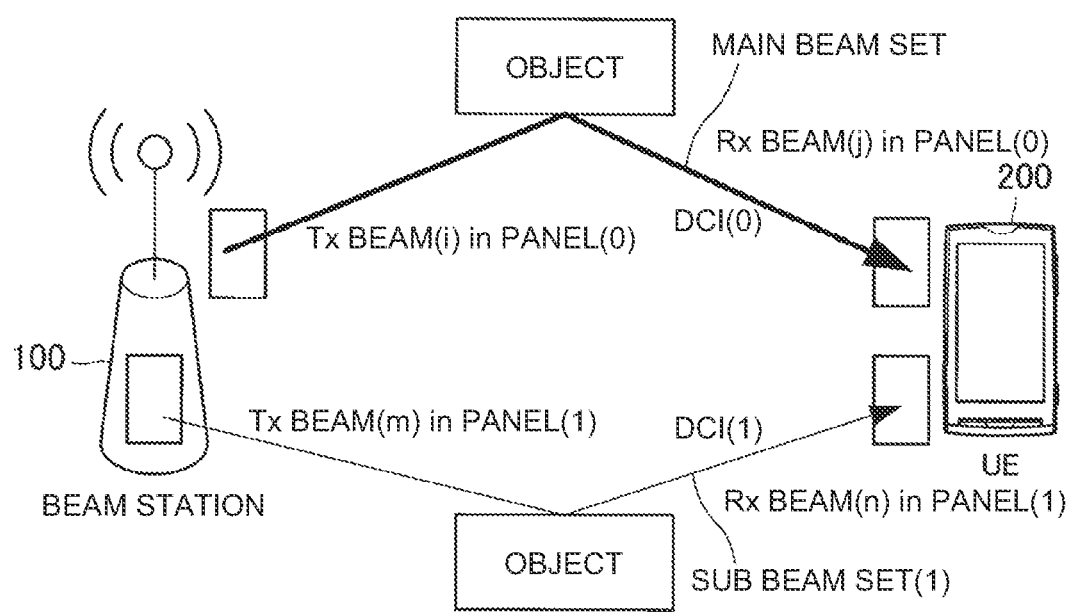
FIG. 15 is an explanatory diagram illustrating a main beam set and a sub beam set.
Figure 16:
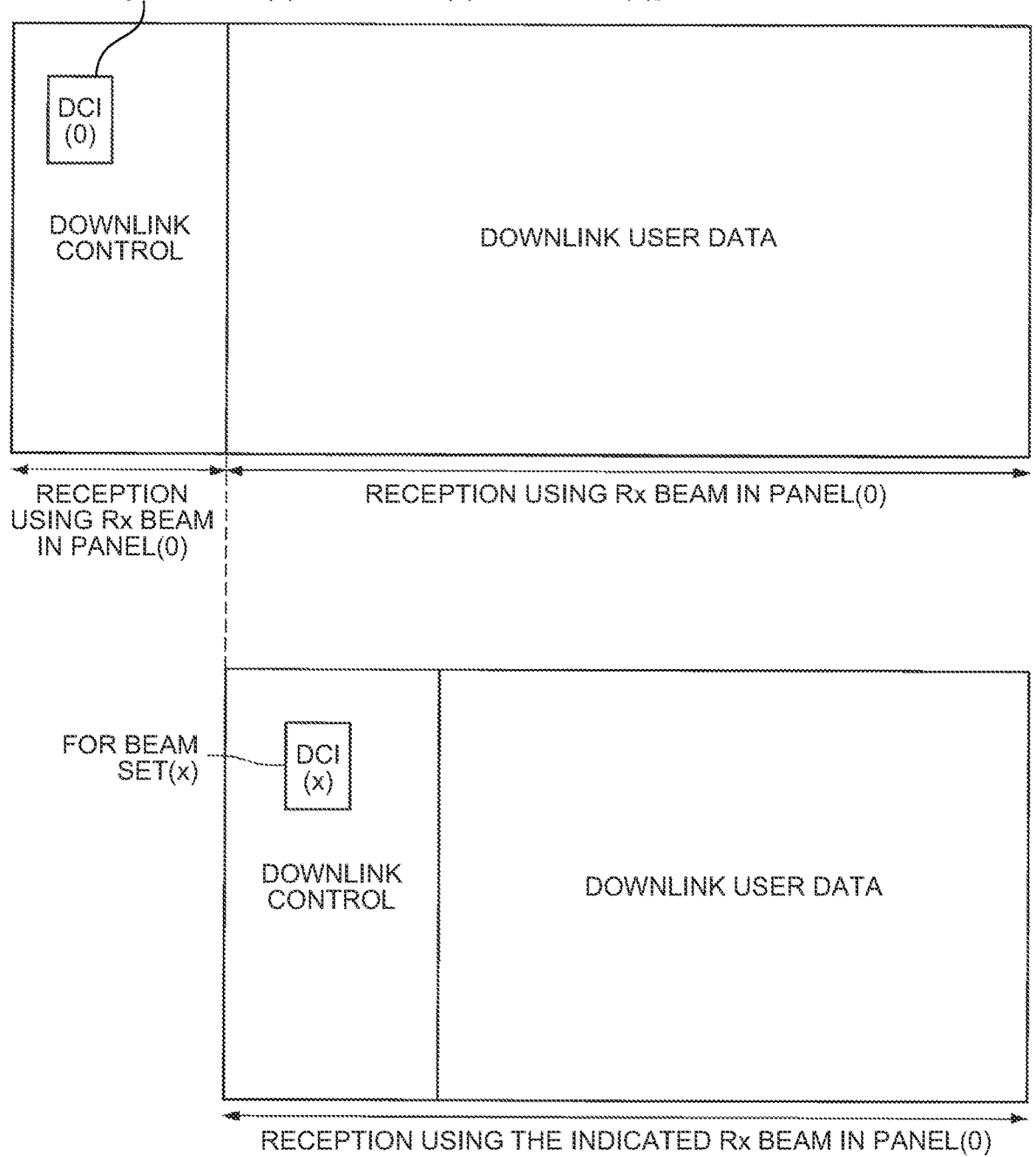
FIG. 16 is an explanatory diagram illustrating an example of the data transmitted from the base station.

A specific example is explained below. FIG. 15 is an explanatory diagram illustrating the main beam set and a sub beam set. As illustrated in FIG. 15, from among a plurality of beam sets obtained in the beam management stage, one beam set is treated as the main beam set and is assigned to the terminal device 200 by the base station 100. Thus, at the time of reception, the terminal device 200 invariably uses the antenna panel meant for the main beam set. FIG. 16 is an explanatory diagram illustrating an example of the data transmitted from the base station 100. In the DCI (0) present in the downlink control region illustrated in FIG. 16, an instruction is provided in such a form that makes it possible to understand the beam set that should be used at the time of receiving the beams of another beam set and to understand the antenna panel corresponding to that beam set.

Figure 17:
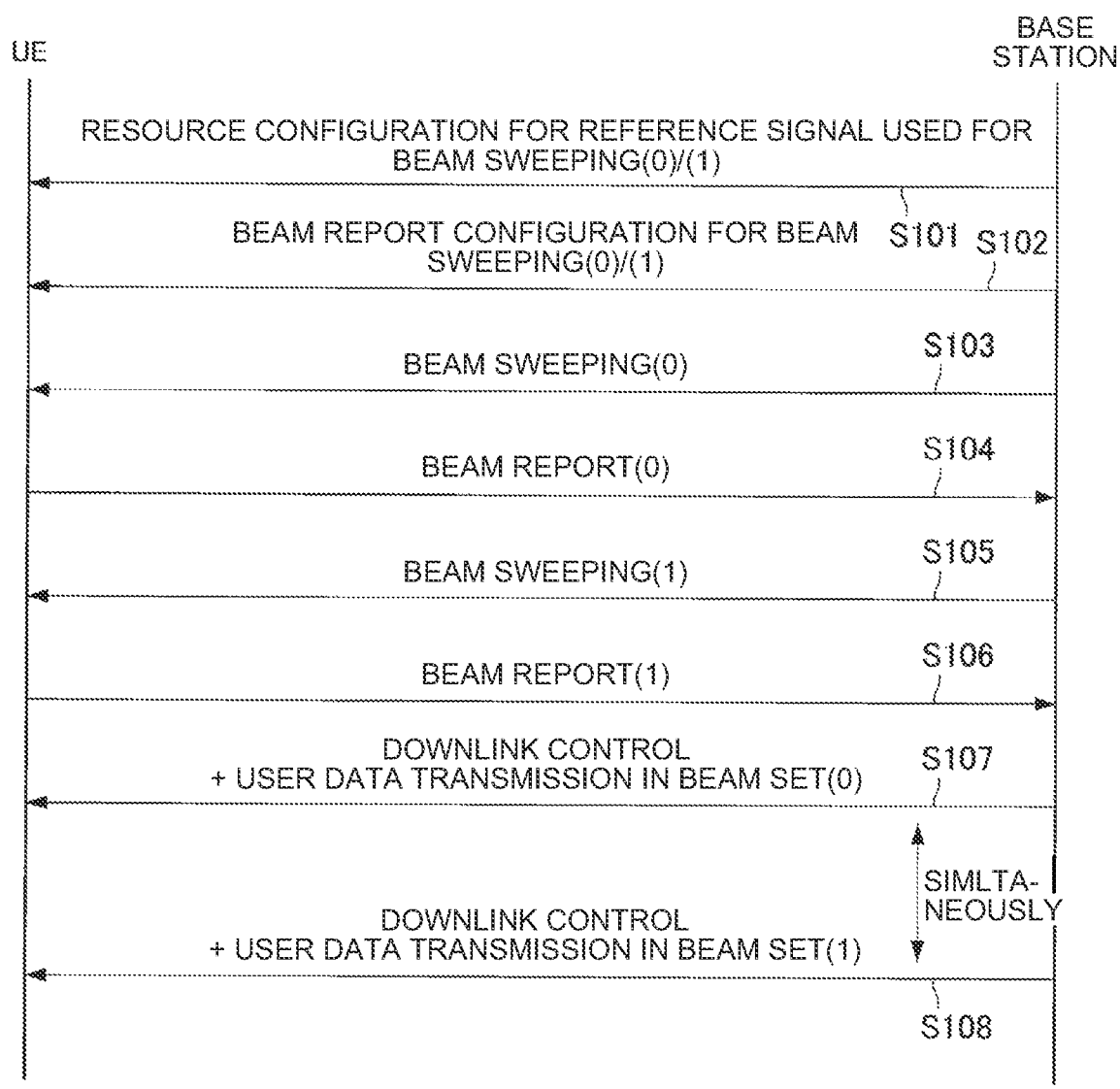
FIG. 17 is a flowchart for explaining an example of the operations performed in the base station and the terminal device according to a second embodiment of the application concerned.

FIG. 17 is a flowchart for explaining an example of the operations performed in the base station 100 and the terminal device 200 according to the second embodiment of the application concerned.

The base station 100 notifies the terminal device 200 about the resource configuration for the reference signal used for two instances of beam sweeping (Step S101). Moreover, the base station 100 notifies the terminal device 200 about a beam report configuration regarding the two instances of beam sweeping (Step S102).

Then, the base station 100 performs beam sweeping (Steps S103 and S105), and the terminal device 200 transmits a beam report regarding each instance of beam sweeping to the base station 100 (Steps S104 and S106).

Subsequently, the base station 100 transmits DCIs and user data using the two beam sets (Steps S107 and S108). Herein, the transmission using the two beam sets can be performed in a simultaneous manner. The terminal device 200 receives the DCIs and the user data using the antenna panels and the beams as decided by the base station 100.

In this way, the main beam set and the sub beam sets are defined, and the beam set that should be used at the time of receiving the beams of a sub beam set and the antenna panel corresponding to that beam set are specified by the base station 100. Hence, the antenna panel and the beams that should be used by the terminal device 200 can be dynamically specified from the base station 100.

According to that method, based on the instruction from the base station 100, the terminal device 200 becomes able to dynamically activate the antenna panel to be used in the sub beam set. The following explanation is given about when to deactivate the activated antenna panel. Fundamentally, regarding an antenna panel that has been dynamically activated using a DCI, it is desirable that the terminal device 200 deactivates that antenna panel after the end of the slot (14 OFDM symbol) representing the unit of scheduling. However, at the time of activation in the DCI, if it is specified to perform activation for N number of successive slots, it is desirable that the terminal device 200 deactivates the antenna panel, which is used in the sub beam set, after the elapse of those N number of slots.

According to the second embodiment, since the antenna panels are activated only when necessary, it becomes possible to reduce the power consumption of the terminal device 200.

<<5. Application Examples>>

The technology according to the application concerned can be applied in various products.

For example, each base station 100 can be implemented as an eNB (evolved Node B) of either the macro eNB type or the small eNB type. A small eNB, such as a pico eNB, or a micro eNB, or a home (femto) eNB, can be an eNB covering smaller cells than macro cells. Alternatively, each base station 100 can be implemented as a base station of some other type such as NodeB or BTS (Base Transceiver Station). The base station 100 can include the main body (base station device) that controls the radio communication, and include one or more RRHs (Remote Radio Heads) placed at different locations than the main body. Still alternatively, various types of terminals (described later) can be configured to execute, temporarily or permanently, the base station function, and operate as the base stations 100.

Meanwhile, for example, each terminal device 200 can be implemented as a smartphone, a tablet PC (Personal Computer), a notebook PC, a portable game terminal, a mobile terminal such as a portable-type/dongle-type mobile router or a digital camera, or an in-vehicle terminal such as a car navigation device. Alternatively, the terminal devices 200 can be implemented as terminals performing M2M (Machine To Machine) communication (also called MTC (Machine Type Communication) terminals). Still alternatively, the terminal devices 200 can be radio communication modules (for example, integrated circuit modules configured using a single die) installed on terminals.

<5.1. Application Examples Related to Base Station>

First Application Example

Figure 18:
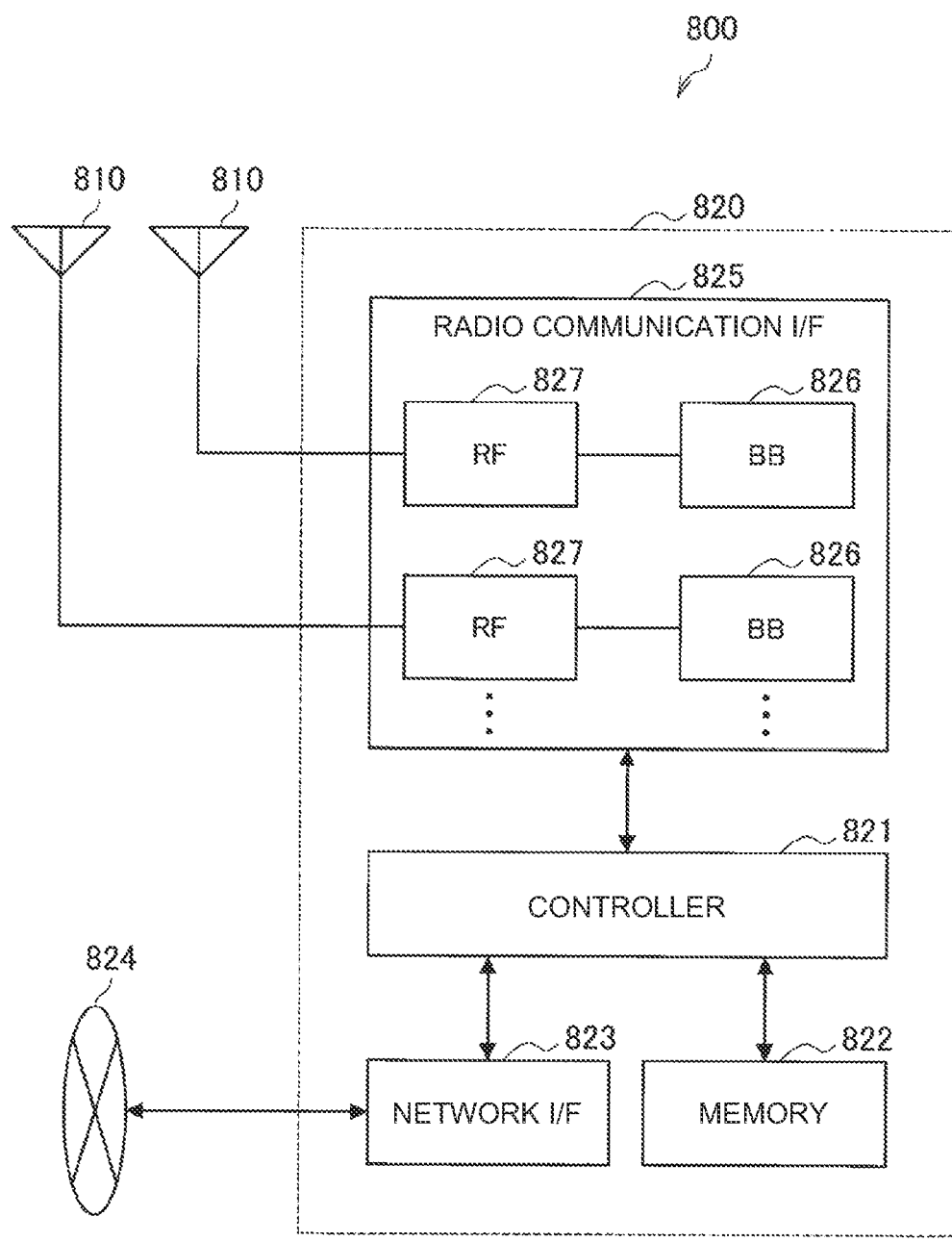
FIG. 18 is a block diagram illustrating a first example of a schematic configuration of an eNB.

FIG. 18 is a block diagram illustrating a first example of a schematic configuration of the eNB in which the technology disclosed in the application concerned is applicable. An eNB 800 includes one or more antennas 810 and a base station device 820. The antennas 810 can be connected to the base station device 820 by RF cables.

Each antenna 810 includes one or more antenna elements (for example, a plurality of antenna elements constituting a MIMO antenna), and is used by the base station device 820 in transmitting and receiving radio signals. The eNB 800 includes a plurality of antennas 810 as illustrated in FIG. 18, and each antenna 810 corresponds to, for example, one of a plurality of frequency bands used by the eNB 800. Meanwhile, in the example illustrated in FIG. 18, although the eNB 800 includes a plurality of antennas 810, it can alternatively include only a single antenna 810.

The base station device 820 includes a controller 821, a memory 822, a network interface 823, and a radio communication interface 825.

The controller 821 can be, for example, a CPU or a DSP, and implements various functions of the upper layer of the base station device 820. For example, the controller 821 generates data packets from the data present in the signals processed by the radio communication interface 825, and transfers the generated data packets via the network interface 823. Moreover, the controller 821 can generate bundled packets by bundling the data received from a plurality of baseband processors, and transfer the bundled packets. Furthermore, the controller 821 can have logical functions for performing control such as radio resource control, radio bearer control, mobility management, admission control, and scheduling. That control can be performed in coordination with the surrounding eNBs or core network nodes. The memory 822 includes a RAM and a ROM, and is used to store programs executed by the controller 821 and to store a variety of control data (such as a terminal list, transmission power data, and scheduling data).

The network interface 823 is a communication interface for connecting the base station device 820 to a core network 824. The controller 821 can communicate with core network nodes and the other eNBs via the network interface 823. In that case, the eNB 800 can be connected to the core network nodes and the other eNBs by a logical interface (such as an S1 interface or an X2 interface). The network interface 823 can be a wired communication interface, or can be a radio communication interface for radio backhauling. When the network interface 823 is a radio communication interface, it can perform radio communication using higher frequency bands than the frequency bands used by the radio communication interface 825.

The radio communication interface 825 supports any one cellular communication method such as the LTE (Long Term Evolution) or the LTE-Advanced, and provides radio connection via the antennas 810 to the terminals located inside the cell of the eNB 800. Typically, the radio communication interface 825 can include a baseband (BB) processor 826 and an RF circuit 827. The BB processor 826 can perform, for example, encoding/decoding, modulation/demodulation, and multiplexing/inverse multiplexing; and performs a variety of signal processing for each layer (for example, L1, MAC (Medium Access Control), RLC (Radio Link Control), and PDCP (Packet Data Convergence Protocol)). The BB processor 826 can include, in place of the controller 821, some or all of the logical functions mentioned earlier. The BB processor 826 can be a module including a memory for storing a communication control program, a processor for executing that program, and related circuits; and the functions of the BB processor 826 can be changed by updating the communication control program. Alternatively, the module can be a card or a blade that is inserted in a slot of the base station device 820, or can be a chip installed on the card or the blade. The RF circuit 827 can include a mixer, a filter, and an amplifier; and transmits and receives radio signals via the antennas 810.

The radio communication interface 825 includes a plurality of BB processors 826 as illustrated in FIG. 18, and each BB processor 826 can correspond to, for example, one of a plurality of frequency bands used by the eNB 800. Moreover, the radio communication interface 825 includes a plurality of RF circuits 827 as illustrated in FIG. 18, and each RF circuit 827 can correspond to, for example, one of a plurality of antenna elements. In FIG. 18 is illustrated the example in which the radio communication interface 825 includes a plurality of BB processors 826 and a plurality of RF circuits 827. However, alternatively, the radio communication interface 825 can include only a single BB processor 826 or only a single RF circuit 827.

In the eNB 800 illustrated in FIG. 18, one or more constituent elements of the control unit 150 explained with reference to FIG. 11 (i.e., the setting unit 151 and/or the communication control unit 153) can be implemented in the radio communication interface 825. Alternatively, at least some of the constituent elements can be installed in the controller 821. As an example, in the eNB 800, a module including either some part of the radio communication interface 825 (for example, the BB processor 826) or the entire radio communication interface 825 and/or the controller 821 can be installed, and the abovementioned one or more constituent elements can be implemented in that module. In that case, the module can store therein a program meant for making the processor function as the abovementioned one or more constituent elements (in other words, a program meant for executing the operations of the abovementioned one or more constituent elements in the processor), and can execute that program. As another example, the program meant for making the processor function as the abovementioned one or more constituent elements can be installed in the eNB 800, and the radio communication interface 825 (for example, the BB processor 826) and/or the controller 821 can execute that program. As described above, the eNB 800, or the base station device 820, or the abovementioned module can be provided as a device including the abovementioned one or more constituent elements; or a program meant for making a processor function as the abovementioned one or more constituent elements can be provided. Alternatively, a readable recording medium in which the program is recorded can be provided.

Moreover, in the eNB 800 illustrated in FIG. 18, the radio communication unit 120 that is explained with reference to FIG. 11 can be implemented in the radio communication interface 825 (for example, the RF circuit 827). Furthermore, the antenna unit 110 can be implemented in the antenna 810. Moreover, the network communication unit 130 can be implemented in the controller 821 and/or the network interface 823. Furthermore, the memory unit 140 can be implemented in the memory 822.

Second Application Example

Figure 19:
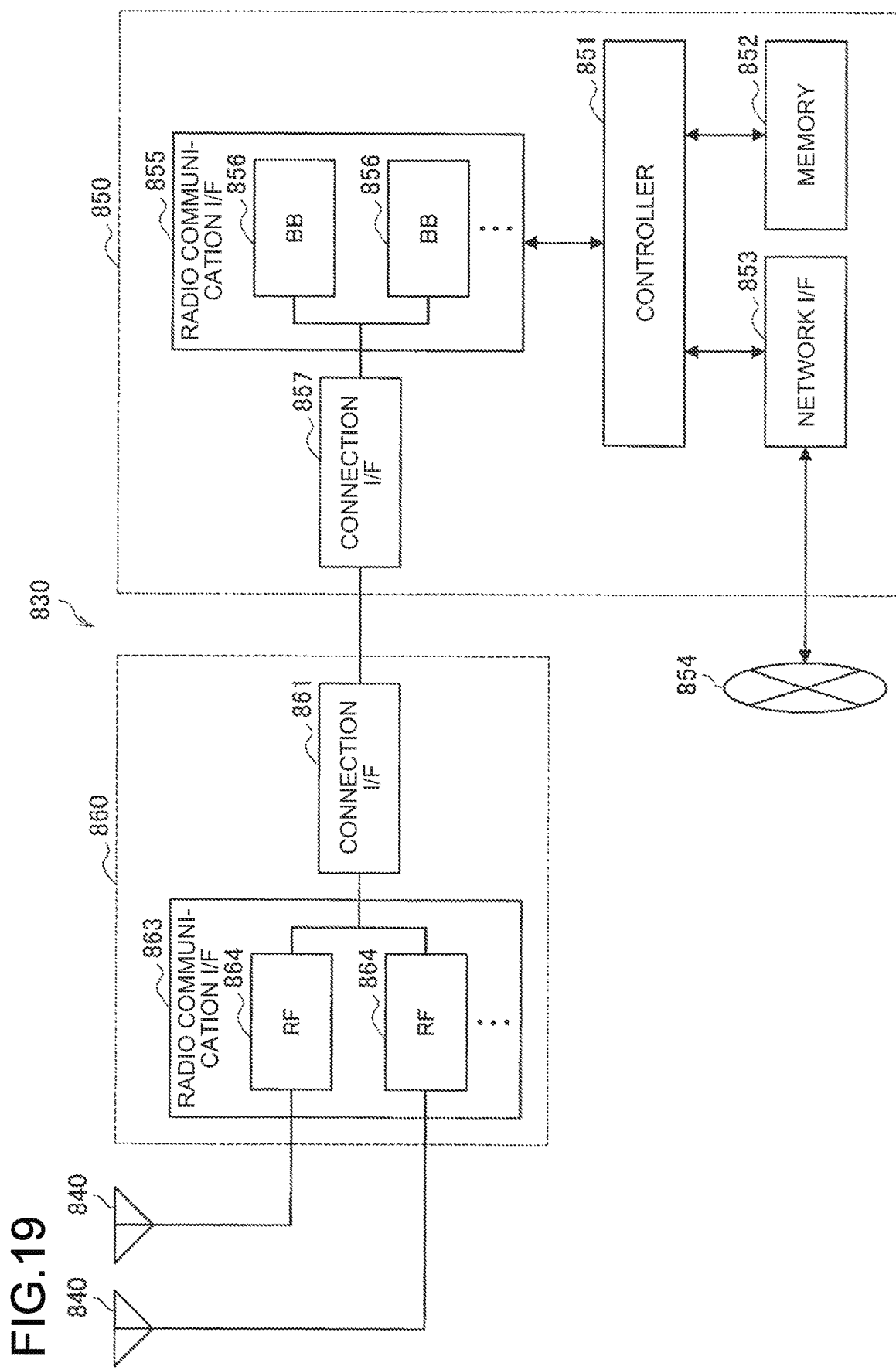
FIG. 19 is a block diagram illustrating a second example of a schematic configuration of the eNB.

FIG. 19 is a block diagram illustrating a second example of a schematic configuration of the eNB in which the technology disclosed in the application concerned is applicable. An eNB 830 includes one or more antennas 840, a base station device 850, and an RRH 860. Each antenna 840 is connected to the RRH 860 by an RF cable. Moreover, the base station device 850 and the RRH 860 can be connected to each other by a high-speed line such as an optical fiber cable.

Each antenna 840 includes one or more antenna elements (for example, a plurality of antenna elements constituting a MIMO antenna), and is used by the RRH 860 in transmitting and receiving radio signals. The eNB 830 includes a plurality of antennas 840 as illustrated in FIG. 19, and each antenna 840 corresponds to, for example, one of a plurality of frequency bands used by the eNB 830. Meanwhile, in the example illustrated in FIG. 19, although the eNB 830 includes a plurality of antennas 840, it can alternatively include only a single antenna 840.

The base station device 850 includes a controller 851, a memory 852, a network interface 853, a radio communication interface 855, and a connection interface 857. The controller 851, the memory 852, and the network interface 853 are identical to the controller 821, the memory 822, and the network interface 823, respectively, explained with reference to FIG. 18.

The radio communication interface 855 supports any one cellular communication method such as the LTE or the LTE-Advanced, and provides radio connection via the RRH 860 and the antennas 840 to the terminals located inside the sector corresponding to the RRH 860. Typically, the radio communication interface 855 can include a BB processor 856. The BB processor 856 is identical to the BB processor 826 explained with reference to FIG. 18, except for the fact that the BB processor 856 is connected to an RF circuit 864 of the RRH 860 via the connection interface 857. The radio communication interface 855 includes a plurality of BB processors 856 as illustrated in FIG. 19, and each BB processor 856 can correspond to, for example, one of a plurality of frequency bands used by the eNB 830. Meanwhile, in the example illustrated in FIG. 19, although the radio communication interface 855 includes a plurality of BB processors 856, it can alternatively include only a single BB processor 856.

The connection interface 857 is meant for connecting the base station device 850 (the radio communication interface 855) to the RRH 860. The connection interface 857 can be a communication module for enabling communication in the abovementioned high-speed line connecting the base station device 850 (the radio communication interface 855) and the RRH 860.

The RRH 860 includes a connection interface 861 and a radio communication interface 863.

The connection interface 861 is an interface for connecting the RRH 860 (the radio communication interface 863) to the base station device 850. The connection interface 861 can be a communication module enabling communication in the high-speed line.

The radio communication interface 863 transmits and receives radio signals via the antenna 840. Typically, the radio communication interface 863 can include the RF circuit 864. The RF circuit 864 can include a mixer, a filter, and an amplifier; and transmits and receives radio signals via the antennas 840. The radio communication interface 863 includes a plurality of RF circuits 864 as illustrated in FIG. 19, and each RF circuit 864 can correspond to, for example, one of a plurality of antenna elements. Meanwhile, in the example illustrated in FIG. 19, although the radio communication interface 863 includes a plurality of RF circuits 864, it can alternatively include only a single RF circuit 864.

In the eNB 830 illustrated in FIG. 19, one or more constituent elements included in the control unit 150 explained with reference to FIG. 11 (i.e., the setting unit 151 and/or the communication control unit 153) can be implemented in the radio communication interface 855 and/or the radio communication interface 863. Alternatively, at least some of the constituent elements can be installed in the controller 851. As an example, in the eNB 830, a module including either some part of the radio communication interface 855 (for example, the BB processor 856) or the entire radio communication interface 855 and/or the controller 851 can be installed, and the abovementioned one or more constituent elements can be implemented in that module. In that case, the module can store therein a program meant for making the processor function as the abovementioned one or more constituent elements (in other words, a program meant for executing the operations of the abovementioned one or more constituent elements in the processor), and can execute that program. As another example, the program meant for making the processor function as the abovementioned one or more constituent elements can be installed in the eNB 830, and the radio communication interface 855 (for example, the BB processor 856) and/or the controller 851 can execute that program. As described above, the eNB 830, the base station device 850, or the abovementioned module can be provided as a device including the abovementioned one or more constituent elements; or a program meant for making a processor function as the abovementioned one or more constituent elements can be provided. Alternatively, a readable recording medium in which the program is recorded can be provided.

Moreover, in the eNB 830 illustrated in FIG. 19, the radio communication unit 120 that is explained with reference to FIG. 11 can be implemented in the radio communication interface 863 (for example, the RF circuit 864). Furthermore, the antenna unit 110 can be implemented in the antenna 840. Moreover, the network communication unit 130 can be implemented in the controller 851 and/or the network interface 853. Furthermore, the memory unit 140 can be implemented in the memory 852.

<5.2. Application Examples Related to Terminal Device>

First Application Example

Figure 20:
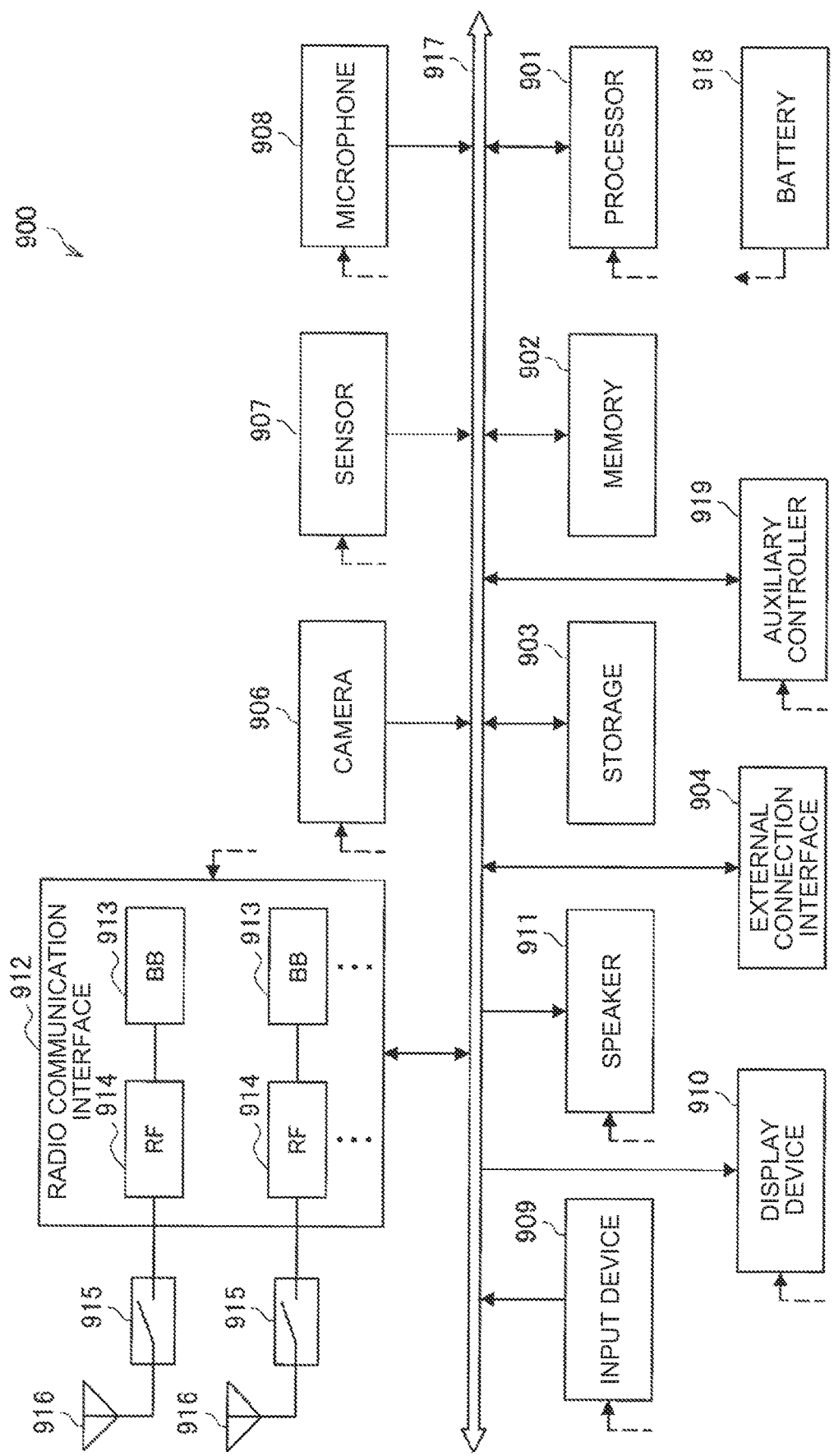
FIG. 20 is a block diagram illustrating an example of a schematic configuration of a smartphone.

FIG. 20 is a block diagram illustrating an example of a schematic configuration of a smartphone 900 in which the technology disclosed in the application concerned is applicable. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 can be, for example, a CPU or an SoC (System on Chip), and controls the functions of the application layer and the other layers of the smartphone 900. The memory 902 includes a RAM and a ROM, and is used to store the programs executed by the processor 901 and to store data. The storage 903 can include a memory medium such as a semiconductor memory or a hard disk. The external connection interface 904 is an interface for connecting an external device, such as a memory card or a USB (Universal Serial Bus) device, to the smartphone 900.

The camera 906 includes an imaging device such as a CCD (Charge Coupled Device) or a CMOS (Complementary Metal Oxide Semiconductor), and generates captured images. The sensor 907 can include a group of sensors such as a positioning sensor, a gyro sensor, a geomagnetic sensor, and an acceleration sensor. The microphone 908 converts the sounds input to the smartphone 900 into sound signals. The input device 909 includes, for example, a touch sensor for detecting a touch on the screen of the display device 910, a keypad, a keyboard, and buttons or switches; and receives operations and information input from the user. The display device 910 has a screen such as a liquid crystal display (LCD) or an organic light emitting diode (OLED), and displays output images of the smartphone 900. The speaker 911 converts the sound signals, which are output from the smartphone 900, into sound.

The radio communication interface 912 supports any one cellular communication method such as the LTE or the LTE-Advanced, and implements radio communication. Typically, the radio communication interface 912 can include a BB processor 913 and an RF circuit 914. The BB processor 913 can perform, for example, encoding/decoding, modulation/demodulation, and multiplexing/inverse multiplexing; and performs a variety of signal processing for radio communication. The RF circuit 914 can include a mixer, a filter, and an amplifier; and transmits and receives radio signals via the antennas 916. Meanwhile, the radio communication interface 912 can be a one-chip module in which the BB processor 913 and the RF circuit 914 are integrated. Moreover, the radio communication interface 912 can include a plurality of BB processors 913 and a plurality of RF circuits 914 as illustrated in FIG. 20. Meanwhile, in the example illustrated in FIG. 20, although the radio communication interface 912 includes a plurality of BB processors 913 and a plurality of RF circuits 914, it can alternatively include only a single BB processor 913 or only a single RF circuit 914.

Moreover, in addition to supporting the cellular communication method, the radio communication interface 912 can also support other types of radio communication methods such as the near field communication method, the proximity radio communication method, and the wireless LAN (Local Area Network) method. In that case, the radio communication interface 912 can include the BB processors 913 and the RF circuits 914 separately for each radio communication method.

Each antenna switch 915 switches the connection destinations of the antennas 916 among a plurality of circuits included in the radio communication interface 912 (for example, the circuits meant for different radio communication methods).

Each antenna 916 includes one or more antenna elements (for example, a plurality of antenna elements constituting a MIMO antenna), and is used by the radio communication interface 912 in transmitting and receiving radio signals. The smartphone 900 can include a plurality of antennas 916 as illustrated in FIG. 20. Meanwhile, in the example illustrated in FIG. 20, although the smartphone 900 includes a plurality of antennas 916, it can alternatively include only a single antenna 916.

Moreover, the smartphone 900 can include the antennas 916 separately for each radio communication method. In that case, the antenna switch 915 can be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies electrical power to each block of the smartphone 900, which is illustrated in FIG. 20, via a power supply line that is partially illustrated in FIG. 20 using dashed lines. The auxiliary controller 919 implements the minimum required functions of the smartphone 900 in, for example, the sleep mode.

In the smartphone 900 illustrated in FIG. 20, one or more constituent elements included in the control unit 240 explained with reference to FIG. 12 (i.e., the obtaining unit 241 and/or the communication control unit 243) can be implemented in the radio communication interface 912. Alternatively, at least some of the constituent elements can be installed in the processor 901 or the auxiliary controller 919. As an example, in the smartphone 900, a module including either some part of the radio communication interface 912 (for example, the BB processor 913) or the entire radio communication interface 912, the processor 901, and/or the auxiliary controller 919 can be installed; and the abovementioned one or more constituent elements can be implemented in that module. In that case, the module can store therein a program meant for making the processor function as the abovementioned one or more constituent elements (in other words, a program meant for executing the operations of the abovementioned one or more constituent elements in the processor), and can execute that program. As another example, the program meant for making the processor function as the abovementioned one or more constituent elements can be installed in the smartphone 900; and the radio communication interface 912 (for example, the BB processor 913), the processor 901, and/or the auxiliary controller 919 can execute that program. As described above, the smartphone 900 or the abovementioned module can be provided as a device including the abovementioned one or more constituent elements; or a program meant for making a processor function as the abovementioned one or more constituent elements can be provided. Alternatively, a readable recording medium in which the program is recorded can be provided.

Moreover, in the smartphone 900 illustrated in FIG. 20, the radio communication unit 220 that is explained with reference to FIG. 12 can be implemented in the radio communication interface 912 (for example, the RF circuit 914). Furthermore, the antenna unit 210 can be implemented in the antenna 916. Moreover, the memory unit 230 can be implemented in the memory 902.

Second Application Example

Figure 21:
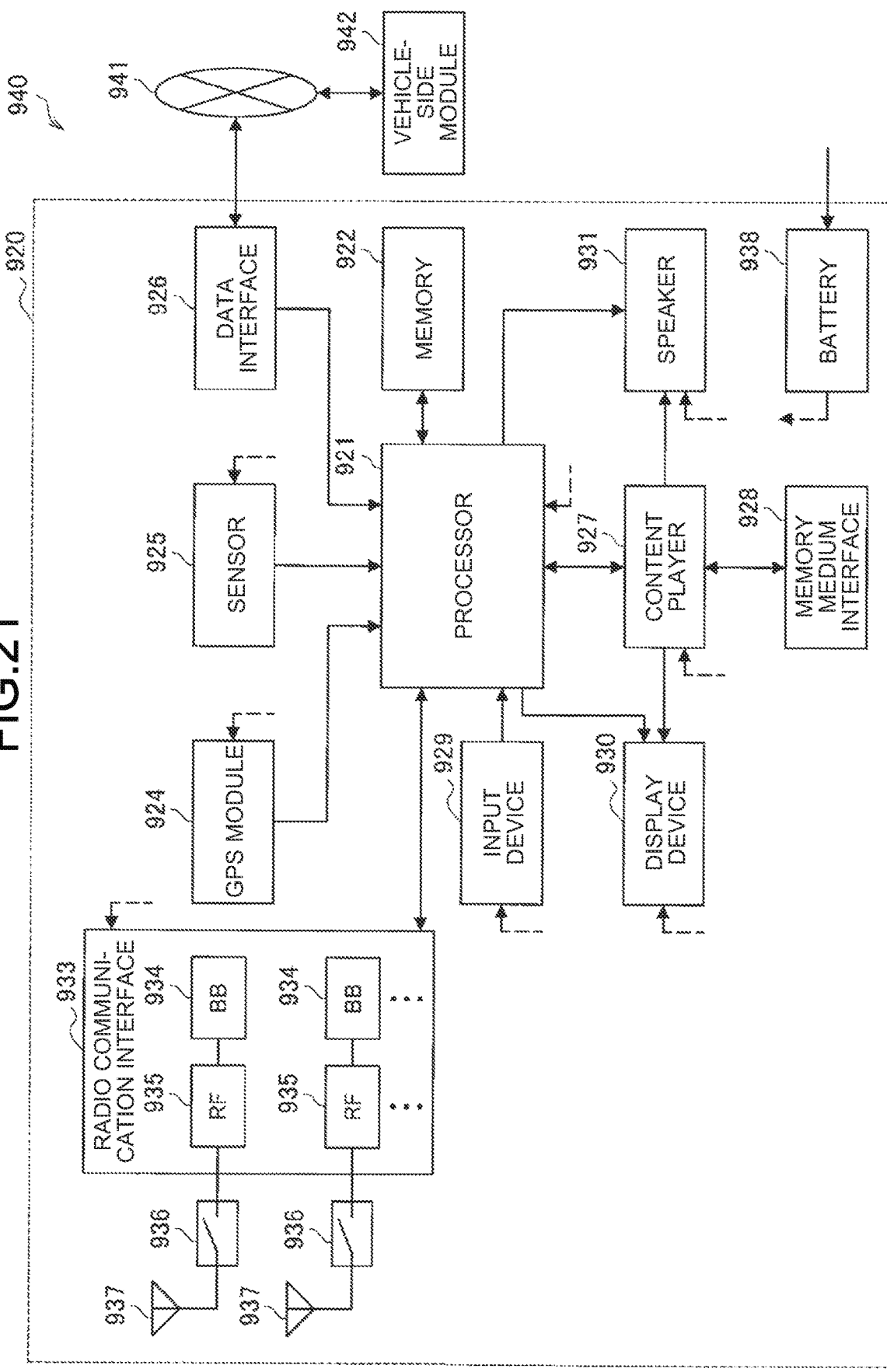
FIG. 21 is a block diagram illustrating an example of a schematic configuration of a car navigation device.

FIG. 21 is a block diagram illustrating an example of a schematic configuration of a car navigation device 920 in which the technology disclosed in the application concerned is applicable. The car navigation device 920 includes a processor 921, a memory 922, a GPS (Global Positioning System) module 924, a sensor 925, a data interface 926, a content player 927, a memory medium interface 928, an input device 929, a display device 930, a speaker 931, a radio communication interface 933, one or more antenna switches 936, one or more antennas 937, and a battery 938.

The processor 921 can be, for example, a CPU or an SoC, and controls the navigation function and the other functions of the car navigation device 920. The memory 922 includes a RAM and a ROM, and is used to store the programs executed by the processor 921 and to store data.

The GPS module 924 uses GPS signals received from GPS satellites, and measures the location (for example, the latitude, the longitude, and the altitude) of the car navigation device 920. The sensor 925 can include a group of sensors such as a gyro sensor, a geomagnetic sensor, and a pressure sensor. The data interface 926 is connected to, for example, an in-vehicle network 941 via a terminal (not illustrated), and obtains data such as vehicle speed data generated in the vehicle.

The content player 927 reproduces the contents stored in a memory medium (such as a CD or a DVD) that is inserted in the memory medium interface 928. The input device 929 includes a touch sensor for detecting a touch on the screen of the display device 930, and includes buttons or switches; and receives operations and information input from the user. The display device 930 has a screen such as an LCD or an OLED, and displays a screen of the navigation function or a screen of the reproduced contents. The speaker 911 converts the sounds of the navigation function or the sounds of the reproduced contents.

The radio communication interface 933 supports any one cellular communication method such as the LTE or the LTE-Advanced, and implements radio communication. Typically, the radio communication interface 933 can include a BB processor 934 and an RF circuit 935. The BB processor 934 can perform, for example, encoding/decoding, modulation/demodulation, and multiplexing/inverse multiplexing; and performs a variety of signal processing for radio communication. The RF circuit 935 can include a mixer, a filter, and an amplifier; and transmits and receives radio signals via the antennas 937. Meanwhile, the radio communication interface 933 can be a one-chip module in which the BB processor 934 and the RF circuit 935 are integrated. Moreover, the radio communication interface 933 can include a plurality of BB processors 934 and a plurality of RF circuits 935 as illustrated in FIG. 21. Meanwhile, in the example illustrated in FIG. 21, although the radio communication interface 933 includes a plurality of BB processor 934 and a plurality of RF circuits 935, it can alternatively include only a single BB processor 934 or only a single RF circuit 935.

Moreover, in addition to supporting the cellular communication method, the radio communication interface 933 can also support other types of radio communication methods such as the near field communication method, the proximity radio communication method, and the wireless LAN method. In that case, the radio communication interface 933 can include the BB processors 934 and the RF circuits 935 separately for each radio communication method.

Each antenna switch 936 switches the connection destinations of the antennas 937 among a plurality of circuits included in the radio communication interface 933 (for example, the circuits meant for different radio communication methods).

Each antenna 937 includes one or more antenna elements (for example, a plurality of antenna elements constituting a MIMO antenna), and is used by the radio communication interface 933 in transmitting and receiving radio signals. The car navigation device 920 can include a plurality of antennas 937 as illustrated in FIG. 21. Meanwhile, in the example illustrated in FIG. 21, although the car navigation device 920 includes a plurality of antennas 937, it can alternatively include only a single antenna 937.

Moreover, the car navigation device 920 can include the antennas 937 separately for each radio communication method. In that case, the antenna switch 936 can be omitted from the configuration of the car navigation device 920.

The battery 938 supplies electrical power to each block of the car navigation device 920, which is illustrated in FIG. 21, via a power supply line that is partially illustrated in FIG. 21 using dashed lines. Moreover, the battery 938 stores the electrical power supplied from the vehicle.

In the car navigation device 920 illustrated in FIG. 21, one or more constituent elements included in the control unit 240 explained with reference to FIG. 12 (i.e., the obtaining unit 241 and/or the communication control unit 243) can be implemented in the radio communication interface 933. Alternatively, at least some of the constituent elements can be installed in the processor 921. As an example, in the car navigation device 920, a module including either some part of the radio communication interface 933 (for example, the BB processor 934) or the entire radio communication interface 933 and/or the processor 921 can be installed; and the abovementioned one or more constituent elements can be implemented in that module. In that case, the module can store therein a program meant for making the processor function as the abovementioned one or more constituent elements (in other words, a program meant for executing the operations of the abovementioned one or more constituent elements in the processor), and can execute that program. As another example, the program meant for making the processor function as the abovementioned one or more constituent elements can be installed in the car navigation device 920; and the radio communication interface 933 (for example, the BB processor 934) and/or the processor 921 can execute that program. As described above, the car navigation device 920 or the abovementioned module can be provided as a device including the abovementioned one or more constituent elements; and a program meant for making a processor function as the abovementioned one or more constituent elements can be provided. Alternatively, a readable recording medium in which the program is recorded can be provided.

Moreover, in the car navigation device 920 illustrated in FIG. 21, the radio communication unit 220 that is explained with reference to FIG. 12 can be implemented in the radio communication interface 933 (for example, the RF circuit 935). Furthermore, the antenna unit 210 can be implemented in the antenna 937. Moreover, the memory unit 230 can be implemented in the memory 922.

Meanwhile, the technology disclosed in the application concerned can be implemented as an in-vehicle system (or a vehicle) 940 that includes one or more blocks of the car navigation device 920; the in-vehicle network 941; and a vehicle-side module 942. The vehicle-side module 942 generates vehicle data such as the vehicle speed, the engine rotation count, and breakdown information; and outputs the generated data to the in-vehicle network 941.

<<6. Summary>>

As described above, according to the embodiments of the application concerned, the base station 100 is provided that performs signaling so that, in a plurality of downlink control regions, which beam of which antenna panel is to be used for the waiting task is set in advance in the terminal device 200. Moreover, according to the embodiments of the application concerned, the terminal device 200 is provided that performs operations based on the setting received from the base station 100 regarding which beam of which antenna panel is to be used for the waiting task in a plurality of downlink control regions.

Meanwhile, the steps of the operations performed by the devices in the present written description need not necessarily be processed chronologically according to the order given in sequence diagrams and flowcharts. For example, the steps of the operations performed by the devices can be processed in a different order than the order given in flowcharts, or can be processed in parallel.

It is also possible to create a computer program for making the hardware such as the CPU, the ROM, and the RAM embedded in each device implement the functions equivalent to the configuration of the device. Moreover, it is also possible to provide a memory medium in which that computer program is stored. Furthermore, the functional blocks illustrated in the functional block diagrams can be configured using hardware or hardware circuits, so as to implement the sequence of operations using hardware or hardware circuits.

Although the application concerned is described above in detail in the form of embodiments with reference to the accompanying drawings; the technical scope of the application concerned is not limited to the embodiments described above. That is, the application concerned is to be construed as embodying all modifications such as other embodiments, additions, alternative constructions, and deletions that may occur to one skilled in the art that fairly fall within the basic teaching herein set forth. In any form thereof, as long as the functions/effects of the application concerned are achieved, the modifications are included in the scope of the application concerned.

The effects described in the present written description are only explanatory and exemplary, and are not limited in scope. That is, in addition to or in place of the effects described above, the technology disclosed in the application concerned enables achieving other effects that may occur to one skilled in the art.

Meanwhile, a configuration as explained below also falls within the technical scope of the application concerned.

(1)

A communication device comprising:

an obtaining unit that performs signaling to obtain information indicating which beam from among a plurality of reception beams of the communication device is to be used for awaiting arrival of control information, which is included in a control region transmitted in a beam from a base station; and a communication control unit that performs control to await arrival of beams from the base station in the beam indicated in the information.

(2)

The communication device according to (1), wherein the plurality of reception beams are simultaneously orientable in different directions.

(3)

The communication device according to (1) or (2), wherein the plurality of reception beams are formed using a phase shifter in an analog domain.

(4)

The communication device according to any one of (1) to (3), wherein the obtaining unit receives downlink transmission signals with gaps provided therebetween for enabling switching of antenna panel in which beams transmitted from the base station are to be received.

(5)

The communication device according to (4), wherein in a plurality of control regions of the downlink transmission signals, setting is performed regarding which antenna panel and which beam are to be used for waiting task, and the communication control unit performs a reception operation based on the setting.

(6)

The communication device according to (5), wherein a beam using different of the antenna panel is specified using resource of a reference signal that is transmitted from the base station.

(7)

The communication device according to any one of (1) to (6), wherein the obtaining unit obtains, using signaling from the base station, fact about which control information from among a plurality of sets of control information is present in the control regions.

(8)

The communication device according to (7), wherein the communication control unit performs a reception operation of the control information based on the signaling.

(9)

The communication device according to any one of (1) to (8), wherein the obtaining unit obtains notification of information about a main beam set from the base station, and according to the notification, the communication control unit decides on antenna panel and beam to be used at time of reception.

(10)

The communication device according to (9), wherein, according to a control signal transmitted as the main beam set from the base station, the communication control unit decides on antenna panel and beams that, as a sub beam set different than the main beam set, are to be used at time of receiving control signals and data from the base station.

(11)

A communication control device comprising:

a communication control unit that sets control information indicating which beam from among a plurality of reception beams of a terminal device is to be used for awaiting arrival of control information, which is included in a control region transmitted in a beam from the communication control device; and a communication unit that transmits the information using signaling.

(12)

The communication control device according to (11), wherein the communication unit transmits downlink transmission signals with gaps provided therebetween for enabling switching of antenna panel of the terminal device in which beams transmitted from the communication control device are to be received.

(13)

The communication control device according to (12), wherein the communication control unit performs setting in the terminal device about which antenna panel and which beam are to be used for waiting task in a plurality of control regions of the downlink transmission signals.

(14)

The communication control device according to any one of (11) to (13), wherein the communication unit notifies, using signaling, which control information from among a plurality of sets of control information is present in the control regions.

(15)

The communication control device according to any one of (11) to (14), wherein the communication unit notifies the terminal device about information on a main beam set.

(16)

The communication control device according to (15), wherein, using control signal transmitted from the communication control device as the main beam set, the communication unit notifies the terminal device about information on a sub beam set that is different than the main beam set.

(17)

A communication method implemented in a processor, comprising:

obtaining that includes performing signaling to obtain information indicating which beam from among a plurality of reception beams of concerned device is to be used for awaiting arrival of control information, which is included in a control region transmitted in a beam from a base station; and performing control to await arrival of beams from the base station in the beam indicated in the information.

(18)

A communication control method implemented in a processor, comprising:

setting control information that indicates which beam from among a plurality of reception beams of a terminal device is to be used for awaiting arrival of control information, which is included in a control region transmitted in a beam from concerned device; and transmitting the information using signaling.

REFERENCE SIGNS LIST

100 base station
200 terminal device

The invention claimed is:

1. A communication device, comprising:
a plurality of antenna panels configured to receive a plurality of reception beams from a base station; and
circuitry configured to:
perform a signaling operation to obtain information indicating a first beam of the plurality of reception beams to be used to await arrival of first control information, wherein the first control information is included in a control region transmitted in the first beam from the base station;
receive a plurality of downlink transmission signals, wherein the plurality of downlink transmission signals includes gaps for switch of the plurality of antenna panels, wherein
the plurality of downlink transmission signals includes a plurality of control regions that includes a setting indicating a first antenna panel of the plurality of antenna panels to be used for a waiting task and the first beam to be used for the waiting task, and
the plurality of control regions includes the control region;
perform, based on the obtained information, a control operation to await arrival of second beams of the plurality of reception beams from the base station; and
perform a first reception operation based on the setting.

2. The communication device according to claim 1, wherein the plurality of reception beams is simultaneously orientable in different directions.

3. The communication device according to claim 1, wherein the plurality of reception beams is formed by a phase shifter in an analog domain.

4. The communication device according to claim 1, wherein a third beam of the plurality of reception beams that uses a different antenna panel than the plurality of antenna panels is specified based on a resource of a reference signal transmitted from the base station.

5. The communication device according to claim 1, wherein the circuitry is further configured to obtain, by the signaling operation from the base station, information indicating second control information from among a plurality of sets of control information is present in the plurality of control regions.

6. The communication device according to claim 5, wherein the circuitry is further configured receive the second control information based on the signaling operation.

7. The communication device according to claim 1, wherein the circuitry is further configured to:
    obtain, from the base station, notification of information about a main beam set; and
    determine, based on the notification, a second antenna panel of the plurality of antenna panels and a third beam of the plurality of reception beams to be used at a time of execution of a second reception operation.

8. The communication device according to claim 7, wherein the circuitry is further configured to:
    transmit a first control signal as the main beam set; and
    determine, based on the transmitted first control signal, a third antenna panel of the plurality of antenna panels and a fourth beam of the plurality of reception beams to be used at a time of reception of a second receiving control signal and data from the base station, wherein the third antenna panel and the fourth beam correspond to a sub beam set different from the main beam set.

9. A communication control device, comprising:
    circuitry configured to:
        set information indicating a beam of a plurality of reception beams of a terminal device to be used to await arrival of first control information, wherein the first control information which is included in a control region transmitted in the beam from the communication control device;
        transmit a plurality of downlink transmission signals to the terminal device, wherein the plurality of downlink transmission signals includes gaps for switch of a plurality of antenna panels of the terminal device;
        set, in a plurality of control regions of the plurality of downlink transmission signals, a first antenna panel of the plurality of antenna panels to be used for a waiting task and the beam to be used for the waiting task, wherein the plurality of control regions includes the control region; and
        transmit the information by a signaling operation.

10. The communication control device according to claim 9, wherein the circuitry is further configured to notify, using the signaling operation, information indicating second control information from among a plurality of sets of control information is present in the plurality of control regions.

11. The communication control device according to claim 9, wherein the circuitry is further configured to notify the terminal device about information on a main beam set.

12. The communication control device according to claim 11, wherein the circuitry is further configured to:
    transmit a control signal as the main beam set; and
    notify, based on the transmitted control signal, the terminal device about information on a sub beam set that is different than the main beam set.

13. A communication method implemented in a processor, comprising:
    performing a signaling operation to obtain information indicating a first beam of a plurality of reception beams of a concerned device to be used for awaiting arrival of control information,
        wherein the control information is included in a control region transmitted in the first beam from a base station;
    receiving a plurality of downlink transmission signals that includes gaps for switching a plurality of antenna panels of the concerned device, wherein
        the plurality of downlink transmission signals includes a plurality of control regions that includes a setting indicating an antenna panel of the plurality of antenna panels to be used for a waiting task and the first beam to be used for the waiting task, and
        the plurality of control regions includes the control region;
    performing, based on the obtained information, a control operation to await arrival of second beams of the plurality of reception beams from the base station; and
    performing a reception operation based on the setting.

14. A communication control method implemented in a processor, comprising:
    setting information that indicates a beam of a plurality of reception beams of a terminal device to be used for awaiting arrival of control information, wherein the control information is included in a control region transmitted in the beam from a concerned device;
    transmitting a plurality of downlink transmission signals to the terminal device, wherein the plurality of downlink transmission signals includes gaps for switching a plurality of antenna panels of the terminal device;
    setting, in a plurality of control regions of the plurality of downlink transmission signals, an antenna panel of the plurality of antenna panels to be used for a waiting task and the beam to be used for the waiting task, wherein the plurality of control regions includes the control region; and
    transmitting the information by signaling.

15. A communication device, comprising:
    a plurality of antenna panels configured to receive a plurality of reception beams from a base station; and
    circuitry configured to:
        perform a signaling operation to obtain information indicating a first beam of the plurality of reception beams to be used to await arrival of control information, wherein the control information is included in a control region transmitted in the first beam from the base station;
        perform, based on the obtained information, a control operation to await arrival of second beams of the plurality of reception beams from the base station;
        obtain, from the base station, notification of information about a main beam set;
        determine, based on the notification, a first antenna panel of the plurality of antenna panels and a third beam of the plurality of reception beams to be used at a time of execution of a reception operation;
        transmit a first control signal as the main beam set; and determine, based on the transmitted first control signal, a second antenna panel of the plurality of antenna panels and a fourth beam of the plurality of reception beams to be used at a time of reception of a second control signal and data from the base station, wherein the second antenna panel and the fourth beam correspond to a sub beam set different from the main beam set.

\* \* \* \* \*